US009600473B2

(12) United States Patent
Leydon et al.

(10) Patent No.: US 9,600,473 B2
(45) Date of Patent: Mar. 21, 2017

(54) SYSTEMS AND METHODS FOR MULTI-USER MULTI-LINGUAL COMMUNICATIONS

(71) Applicant: Machine Zone, Inc., Palo Alto, CA (US)

(72) Inventors: Gabriel Leydon, Redwood City, CA (US); Francois Orsini, San Francisco, CA (US); Nikhil Bojja, Mountain View, CA (US); Shailen Karur, Santa Clara, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

(21) Appl. No.: 13/763,565

(22) Filed: Feb. 8, 2013

(65) Prior Publication Data
US 2014/0229154 A1 Aug. 14, 2014

(51) Int. Cl.
*G06F 17/28* (2006.01)
*H04L 12/58* (2006.01)
*H04L 12/18* (2006.01)

(52) U.S. Cl.
CPC ........ *G06F 17/289* (2013.01); *G06F 17/2836* (2013.01); *H04L 51/063* (2013.01); *H04L 12/1827* (2013.01)

(58) Field of Classification Search
CPC ......... G10L 15/26; G10L 13/08; G10L 15/18; G06F 17/273; G06F 17/2785; G06F 17/2795
USPC ..... 704/2, 10, 235, 246, 3, 4, 7, 9; 701/540; 705/14.41, 27.1; 707/718, 758, 760, 769; 709/204, 206
See application file for complete search history.

(56) References Cited

U.S. PATENT DOCUMENTS

| 4,460,973 | A | | 7/1984 | Tanimoto et al. |
| 4,502,128 | A | | 2/1985 | Okajima et al. |
| 4,706,212 | A | | 11/1987 | Toma |
| 5,313,534 | A | | 5/1994 | Burel |
| 5,526,259 | A | * | 6/1996 | Kaji .......................... G06F 3/16 704/254 |
| 5,873,055 | A | | 2/1999 | Okunishi |

(Continued)

OTHER PUBLICATIONS

Aikawa et al., "The Impact of Crowdsourcing Post-editing with the Collaborative Translation Framework," JapTAL 2012, LNAI 7614, pp. 1-10. Springer-Verlag Berlin Heidelberg 2012.

(Continued)

*Primary Examiner* — Michael Colucci
(74) *Attorney, Agent, or Firm* — Goodwin Procter LLP

(57) ABSTRACT

Various embodiments described herein facilitate multi-lingual communications. The systems and methods of some embodiments may enable multi-lingual communications through different modes of communications including, for example, Internet-based chat, e-mail, text-based mobile phone communications, postings to online forums, postings to online social media services, and the like. Certain embodiments may implement communications systems and methods that translate text between two or more languages (e.g., spoken), while handling/accommodating for one or more of the following in the text: specialized/domain-related jargon, abbreviations, acronyms, proper nouns, common nouns, diminutives, colloquial words or phrases, and profane words or phrases.

29 Claims, 12 Drawing Sheets

(56) References Cited

U.S. PATENT DOCUMENTS

| | | |
|---|---|---|
| 5,884,246 A | 3/1999 | Boucher et al. |
| 5,991,710 A | 11/1999 | Papineni et al. |
| 6,125,362 A | 9/2000 | Elworthy |
| 6,167,369 A | 12/2000 | Schulze |
| 6,182,029 B1 | 1/2001 | Friedman |
| 6,269,189 B1 | 7/2001 | Chanod |
| 6,285,978 B1 | 9/2001 | Bernth et al. |
| 6,304,841 B1 | 10/2001 | Berger et al. |
| 6,415,250 B1 | 7/2002 | van den Akker |
| 6,425,119 B1 * | 7/2002 | Jones ................ G06F 8/30 717/100 |
| 6,722,989 B1 | 4/2004 | Hayashi |
| 6,799,303 B2 | 9/2004 | Blumberg |
| 6,801,190 B1 | 10/2004 | Robinson et al. |
| 6,848,080 B1 | 1/2005 | Lee et al. |
| 6,993,473 B2 | 1/2006 | Cartus |
| 6,996,520 B2 | 2/2006 | Levin |
| 7,165,019 B1 | 1/2007 | Lee et al. |
| 7,174,289 B2 | 2/2007 | Sukehiro |
| 7,451,188 B2 | 11/2008 | Cheung et al. |
| 7,475,343 B1 * | 1/2009 | Mielenhausen ......... G06F 17/24 715/261 |
| 7,478,033 B2 | 1/2009 | Wu et al. |
| 7,533,013 B2 | 5/2009 | Marcu |
| 7,539,619 B1 | 5/2009 | Seligman et al. |
| 7,895,576 B2 | 2/2011 | Chang et al. |
| 8,010,338 B2 | 8/2011 | Thorn |
| 8,027,438 B2 | 9/2011 | Daigle et al. |
| 8,112,497 B1 | 2/2012 | Gougousis et al. |
| 8,145,472 B2 | 3/2012 | Shore et al. |
| 8,170,868 B2 | 5/2012 | Gamon et al. |
| 8,244,567 B2 | 8/2012 | Estill |
| 8,270,606 B2 | 9/2012 | Caskey et al. |
| 8,311,800 B1 | 11/2012 | Delaney et al. |
| 8,326,601 B2 | 12/2012 | Ribeiro et al. |
| 8,380,488 B1 | 2/2013 | Liu et al. |
| 8,392,173 B2 | 3/2013 | Davis et al. |
| 8,468,149 B1 | 6/2013 | Lung et al. |
| 8,473,555 B2 | 6/2013 | Lai et al. |
| 8,510,328 B1 * | 8/2013 | Hatton ............. G06F 17/30976 706/45 |
| 8,543,374 B2 * | 9/2013 | Dymetman ......... G06F 17/2775 704/2 |
| 8,566,306 B2 * | 10/2013 | Jones ................ G06F 17/3053 707/718 |
| 8,606,800 B2 * | 12/2013 | Lagad ............... G06F 17/30864 707/736 |
| 8,626,486 B2 | 1/2014 | Och et al. |
| 8,655,644 B2 | 2/2014 | Kanevsky et al. |
| 8,671,019 B1 * | 3/2014 | Barclay ............. G07F 17/3244 463/25 |
| 8,688,433 B2 | 4/2014 | Davis et al. |
| 8,688,451 B2 | 4/2014 | Grost et al. |
| 8,738,355 B2 * | 5/2014 | Gupta ................. H04W 4/028 704/2 |
| 8,762,128 B1 | 6/2014 | Brants et al. |
| 8,788,259 B1 | 7/2014 | Buryak et al. |
| 8,818,791 B2 * | 8/2014 | Xiao ................ G06F 17/2223 704/2 |
| 8,825,467 B1 | 9/2014 | Chen et al. |
| 8,825,469 B1 * | 9/2014 | Duddu ................ G06F 17/2827 704/4 |
| 8,832,204 B1 | 9/2014 | Gailloux |
| 8,838,437 B1 | 9/2014 | Buryak et al. |
| 8,914,395 B2 * | 12/2014 | Jiang ................ G06F 17/30669 704/8 |
| 8,918,308 B2 * | 12/2014 | Caskey ............ G06F 17/30669 704/2 |
| 8,928,591 B2 | 1/2015 | Swartz et al. |
| 8,935,147 B2 * | 1/2015 | Stern ................ G06Q 10/00 704/2 |
| 8,990,064 B2 * | 3/2015 | Marcu ................ G06F 17/289 704/10 |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,031,828 B2 | 5/2015 | Leydon et al. |
| 9,031,829 B2 | 5/2015 | Leydon et al. |
| 9,231,898 B2 | 1/2016 | Orsini et al. |
| 9,245,278 B2 | 1/2016 | Orsini et al. |
| 9,298,703 B2 | 3/2016 | Leydon et al. |
| 9,336,206 B1 | 5/2016 | Orsini et al. |
| 9,348,818 B2 | 5/2016 | Leydon et al. |
| 9,372,848 B2 | 6/2016 | Bojja et al. |
| 9,448,996 B2 | 9/2016 | Orsini et al. |
| 2001/0020225 A1 | 9/2001 | Zerber |
| 2001/0029455 A1 | 10/2001 | Chin et al. |
| 2002/0029146 A1 | 3/2002 | Nir |
| 2002/0037767 A1 | 3/2002 | Ebin |
| 2002/0152063 A1 | 10/2002 | Tokieda et al. |
| 2002/0169592 A1 | 11/2002 | Aityan |
| 2002/0198699 A1 | 12/2002 | Greene et al. |
| 2003/0009320 A1 | 1/2003 | Furuta |
| 2003/0033152 A1 | 2/2003 | Cameron |
| 2003/0046350 A1 * | 3/2003 | Chintalapati ......... G06Q 10/10 709/206 |
| 2003/0101044 A1 | 5/2003 | Krasnov |
| 2003/0125927 A1 | 7/2003 | Seme |
| 2003/0176995 A1 | 9/2003 | Sukehiro |
| 2004/0030750 A1 * | 2/2004 | Moore ................. G10L 15/265 709/204 |
| 2004/0030781 A1 | 2/2004 | Etesse et al. |
| 2004/0044517 A1 * | 3/2004 | Palmquist .......... G06F 17/2809 704/7 |
| 2004/0093567 A1 | 5/2004 | Schabes et al. |
| 2004/0102201 A1 | 5/2004 | Levin |
| 2004/0102956 A1 | 5/2004 | Levin |
| 2004/0102957 A1 | 5/2004 | Levin |
| 2004/0158471 A1 | 8/2004 | Davis et al. |
| 2004/0205671 A1 | 10/2004 | Sukehiro et al. |
| 2004/0210443 A1 | 10/2004 | Kuhn et al. |
| 2004/0243409 A1 | 12/2004 | Nakagawa |
| 2004/0267527 A1 * | 12/2004 | Creamer ................ G10L 15/26 704/235 |
| 2005/0076240 A1 | 4/2005 | Appleman |
| 2005/0102130 A1 | 5/2005 | Quirk et al. |
| 2005/0160075 A1 | 7/2005 | Nagahara |
| 2005/0165642 A1 | 7/2005 | Brouze et al. |
| 2005/0171758 A1 * | 8/2005 | Palmquist ............... G10L 15/26 704/4 |
| 2005/0197829 A1 | 9/2005 | Okumura |
| 2005/0209844 A1 | 9/2005 | Wu et al. |
| 2005/0234702 A1 | 10/2005 | Komiya |
| 2005/0251384 A1 | 11/2005 | Yang |
| 2005/0283540 A1 | 12/2005 | Fux |
| 2005/0288920 A1 * | 12/2005 | Green ................. G06F 17/2785 704/3 |
| 2006/0015812 A1 | 1/2006 | Cunningham et al. |
| 2006/0053203 A1 | 3/2006 | Mijatovic |
| 2006/0101021 A1 | 5/2006 | Davis et al. |
| 2006/0133585 A1 | 6/2006 | Daigle et al. |
| 2006/0136223 A1 | 6/2006 | Brun et al. |
| 2006/0167992 A1 | 7/2006 | Cheung et al. |
| 2006/0173839 A1 | 8/2006 | Knepper et al. |
| 2006/0206309 A1 | 9/2006 | Curry et al. |
| 2006/0271352 A1 | 11/2006 | Nikitin et al. |
| 2007/0016399 A1 | 1/2007 | Gao et al. |
| 2007/0050182 A1 | 3/2007 | Sneddon et al. |
| 2007/0077975 A1 * | 4/2007 | Warda .................. A63F 13/12 463/9 |
| 2007/0088793 A1 | 4/2007 | Landsman |
| 2007/0124133 A1 * | 5/2007 | Wang ................. G06F 17/2818 704/10 |
| 2007/0124202 A1 | 5/2007 | Simons |
| 2007/0129935 A1 | 6/2007 | Uchimoto et al. |
| 2007/0143410 A1 | 6/2007 | Kraft et al. |
| 2007/0168450 A1 | 7/2007 | Prajapat et al. |
| 2007/0218997 A1 | 9/2007 | Cho |
| 2007/0219774 A1 | 9/2007 | Quirk et al. |
| 2007/0219776 A1 | 9/2007 | Gamon et al. |
| 2007/0276814 A1 | 11/2007 | Williams |

(56) References Cited

U.S. PATENT DOCUMENTS

| | | |
|---|---|---|
| 2007/0294076 A1 | 12/2007 | Shore et al. |
| 2008/0005319 A1 | 1/2008 | Anderholm et al. |
| 2008/0052289 A1 | 2/2008 | Kolo et al. |
| 2008/0097745 A1 | 4/2008 | Bagnato et al. |
| 2008/0097746 A1 | 4/2008 | Tagata et al. |
| 2008/0120374 A1 | 5/2008 | Kawa et al. |
| 2008/0126077 A1 | 5/2008 | Thorn |
| 2008/0147408 A1 | 6/2008 | Da Palma et al. |
| 2008/0176655 A1 | 7/2008 | James et al. |
| 2008/0177528 A1 | 7/2008 | Drewes |
| 2008/0183459 A1 | 7/2008 | Simonsen et al. |
| 2008/0243834 A1 | 10/2008 | Rieman et al. |
| 2008/0249760 A1 | 10/2008 | Marcu et al. |
| 2008/0274694 A1 | 11/2008 | Castell et al. |
| 2008/0281577 A1 | 11/2008 | Suzuki |
| 2008/0313534 A1 | 12/2008 | Cheung et al. |
| 2008/0320086 A1* | 12/2008 | Callanan ............... H04L 12/581 704/9 709/206 |
| 2009/0011829 A1 | 1/2009 | Yang |
| 2009/0055175 A1 | 2/2009 | Terrell, II et al. |
| 2009/0068984 A1 | 3/2009 | Burnett |
| 2009/0100141 A1 | 4/2009 | Kirkland et al. |
| 2009/0106695 A1 | 4/2009 | Perry et al. |
| 2009/0125477 A1* | 5/2009 | Lu ..................... G06F 17/30681 |
| 2009/0204400 A1* | 8/2009 | Shields ............... H04M 3/4933 704/246 |
| 2009/0221372 A1 | 9/2009 | Casey et al. |
| 2010/0015581 A1* | 1/2010 | DeLaurentis ......... A63F 3/0423 434/156 |
| 2010/0036661 A1 | 2/2010 | Boucher et al. |
| 2010/0099444 A1 | 4/2010 | Coulter |
| 2010/0138210 A1 | 6/2010 | Seo et al. |
| 2010/0145900 A1 | 6/2010 | Zheng et al. |
| 2010/0180199 A1 | 7/2010 | Wu et al. |
| 2010/0204981 A1 | 8/2010 | Ribeiro et al. |
| 2010/0241482 A1 | 9/2010 | Knyphausen et al. |
| 2010/0268730 A1 | 10/2010 | Kazeoka |
| 2010/0293230 A1 | 11/2010 | Lai et al. |
| 2010/0324894 A1 | 12/2010 | Potkonjak |
| 2011/0022381 A1 | 1/2011 | Gao et al. |
| 2011/0066421 A1 | 3/2011 | Lee et al. |
| 2011/0071817 A1 | 3/2011 | Siivola |
| 2011/0077933 A1 | 3/2011 | Miyamoto et al. |
| 2011/0077934 A1 | 3/2011 | Kanevsky et al. |
| 2011/0082683 A1 | 4/2011 | Soricut et al. |
| 2011/0082684 A1 | 4/2011 | Soricut et al. |
| 2011/0098117 A1 | 4/2011 | Tanaka |
| 2011/0184736 A1 | 7/2011 | Slotznick |
| 2011/0191096 A1 | 8/2011 | Sarikaya et al. |
| 2011/0202344 A1 | 8/2011 | Meyer et al. |
| 2011/0213607 A1 | 9/2011 | Onishi |
| 2011/0219084 A1 | 9/2011 | Borra et al. |
| 2011/0238406 A1* | 9/2011 | Chen ................... G06F 17/2735 704/3 |
| 2011/0238411 A1 | 9/2011 | Suzuki |
| 2011/0246881 A1 | 10/2011 | Kushman et al. |
| 2011/0307356 A1* | 12/2011 | Wiesinger ............. G06Q 30/06 705/27.1 |
| 2011/0307495 A1 | 12/2011 | Shoshan |
| 2011/0320019 A1 | 12/2011 | Lanciani et al. |
| 2012/0109631 A1 | 5/2012 | Gopal et al. |
| 2012/0156668 A1* | 6/2012 | Zelin .................... G09B 5/12 434/362 |
| 2012/0173502 A1 | 7/2012 | Kumar et al. |
| 2012/0179451 A1 | 7/2012 | Miyamoto et al. |
| 2012/0209852 A1 | 8/2012 | Dasgupta et al. |
| 2012/0226491 A1 | 9/2012 | Yamazaki et al. |
| 2012/0233191 A1* | 9/2012 | Ramanujam ...... G06F 17/30867 707/758 |
| 2012/0240039 A1 | 9/2012 | Walker et al. |
| 2012/0246564 A1 | 9/2012 | Kolo |
| 2012/0262296 A1 | 10/2012 | Bezar |
| 2012/0265518 A1 | 10/2012 | Lauder |
| 2012/0303355 A1* | 11/2012 | Liu ..................... G06F 17/2217 704/9 |
| 2013/0006954 A1 | 1/2013 | Nikoulina et al. |
| 2013/0084976 A1 | 4/2013 | Kumaran et al. |
| 2013/0085747 A1 | 4/2013 | Li et al. |
| 2013/0091429 A1 | 4/2013 | Weng et al. |
| 2013/0096911 A1* | 4/2013 | Beaufort ............... G06F 17/273 704/9 |
| 2013/0130792 A1* | 5/2013 | Crocker ................ A63F 13/537 463/31 |
| 2013/0138428 A1 | 5/2013 | Chandramouli et al. |
| 2013/0144599 A1 | 6/2013 | Davis et al. |
| 2013/0173247 A1 | 7/2013 | Hodson |
| 2013/0197896 A1 | 8/2013 | Chalabi et al. |
| 2013/0211821 A1 | 8/2013 | Tseng et al. |
| 2013/0226553 A1 | 8/2013 | Ji |
| 2013/0253834 A1* | 9/2013 | Slusar ................ G01C 21/3608 701/540 |
| 2013/0297316 A1 | 11/2013 | Cragun et al. |
| 2014/0006003 A1* | 1/2014 | Soricut ............... G06F 17/2854 704/2 |
| 2014/0058807 A1 | 2/2014 | Altberg et al. |
| 2014/0142917 A1 | 5/2014 | D'Penha |
| 2014/0163951 A1 | 6/2014 | Nikoulina et al. |
| 2014/0188453 A1 | 7/2014 | Marcu et al. |
| 2014/0199975 A1 | 7/2014 | Lou et al. |
| 2014/0200878 A1 | 7/2014 | Mylonakis et al. |
| 2014/0208367 A1 | 7/2014 | DeWeese et al. |
| 2014/0330760 A1 | 11/2014 | Meier et al. |
| 2015/0161104 A1 | 6/2015 | Buryak et al. |
| 2015/0161114 A1 | 6/2015 | Buryak et al. |
| 2015/0161227 A1 | 6/2015 | Buryak et al. |

OTHER PUBLICATIONS

Ambati et al., "Collaborative Workflow for Crowdsourcing Translation," Proceedings of the ACM 2012 conference on Computer Supported Cooperative Work, ACM, 2012.

Callison-Burch et al., "Creating Speech and Language DataWith Amazon's Mechanical Turk," Proceedings of the NAACL HLT 2010 Workshop on Creating Speech and Language Data with Amazon's Mechanical Turk, pp. 1-12, 2010.

Little, "Turkit: Tools for Iterative Tasks on Mechanical Turk," Visual Languages and Human-Centric Computing, XPO31551118, IEEE, Sep. 20, 2009, pp. 252-253.

Communication Relating to the Results of the Partial International Search, for International Application No. PCT/US2014/040676, mailed Feb. 17, 2015, 5 pages.

U.S. Appl. No. 13/908,979, filed Jun. 3, 2013, by Leydon et al.
U.S. Appl. No. 14/218,668, filed Mar. 18, 2013, by Leydon et al.
U.S. Appl. No. 14/221,142, filed Mar. 20, 2014, by Leydon et al.
U.S. Appl. No. 14/294,668, filed Jun. 3, 2014, by Orsini et al.
U.S. Appl. No. 14/294,675, filed Jun. 3, 2014, by Leydon et al.
U.S. Appl. No. 14/294,684, filed Jun. 3, 2014, by Orsini et al.
U.S. Appl. No. 14/294,690, filed Jun. 3, 2014, by Orsini et al.
U.S. Appl. No. 14/294,661, filed Jun. 3, 2014, by Orsini et al.
U.S. Appl. No. 14/294,698, filed Jun. 3, 2014, by Orsini et al.

International Application No. PCT/US2014/015632, International Search Report and Written Opinion mailed Jul. 8, 2014, 8 pages.

Callison-Burch, Chris, "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.

Popovic, Maja et al., "Syntax-oriented evaluation measures for machine translation output," Proceedings of the Fourth Workshop on Statistical Machine Translation, pp. 29-32, Athens, Greece, Mar. 30-31, 2009.

Shieber, S.M., and Nelken R.; "Abbreviated Text Input Using Language Modeling." Natural Language Eng; 13(2):165-183; Jun. 2007.

Zaidan, Omar F. et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.

(56) References Cited

OTHER PUBLICATIONS

Ahmed, et al., "Language Identification from Text Using n-gram Based Cumulative Frequency Addition," In Proceedings of Student/Faculty Research Day, CSIS, Pace University; pp. 12.1-12.8; May 2004.

Baldwin, T. and Lui, M., "Language identification: The Long and the Short of the Matter," In Proceedings of NAACL-HLT; pp. 229-237; Jun. 2010.

Bergsma, et al., "Language Identification for Creating Language-specific Twitter Collections," In Proceedings of the Second Workshop on Language in Social Media; pp. 65-74; Jun. 2012.

Carter, et al., "Microblog Language Identification: Overcoming the Limitations of Short, Unedited and Idiomatic Text," Language Resources and Evaluation; 47(1): 195-215; Mar. 2013.

Cavnar, W. and Trenkle, J., "N-gram-based Text Categorization," In Proceedings of the Third Symposium on Document Analysis and Information Retrieval; Apr. 1994, 14pgs.

Ceylan, H. and Kim, Y., "Language Identification of Search Engine Queries," In Proceedings of ACL-IJCNLP; 2:1066-1074; Aug. 2009.

Chang, C. and Lin, C., "LIBSVM: A Library for Support Vector Machines," ACM Transactions on Intelligent Systems and Technology, 2(27):1-39; Apr. 2011.

Dunning, "Statistical Identification of Language," Computing Research Laboratory, New Mexico State University; Mar. 1994, 31pgs.

Fan, et al., "LIBLINEAR: A Library for Large Linear Classification," Journal of Machine Learning Research; 9:1871-1874; Aug. 2008.

Foster, et al., "#hardtoparse: POS Tagging and Pursing the Twitterverse," In Proceedings of the AAAI Workshop on Analyzing Microtext; Aug. 2011, 7pgs.

Gottron, T. and Lipka, N., "A Comparison of Language Identification Approaches on Short, Query-style Texts," In Advances in Information Retrieval; pp. 611-614; Mar. 2010.

Grothe, et al., "A Comparative Study on Language Identification Methods," In Proceedings of LREC; pp. 980-985; May 2008.

Hughes, et al., "Reconsidering Language Identification for Written Language Resources," In Proceedings of LREC; pp. 485-488; May 2006.

Hulin et al., "Applications of Item Response Theory to Analysis of Attitude Scale Translations," American Psychological Association; vol. 67(6); Dec. 1982; 51pgs.

Int'l Search Report and Written Opinion of the ISA/US in PCT/US2014/040676; May 6, 2015; 16pgs.

Int'l Search Report and Written Opinion of the ISA/US in PCT/US2014/061141; Jun. 16, 2015; 13pgs.

Liu, et al., "A Broad-coverage Normalization System for Social Media Language," In Proceedings of ACL; pp. 1035-1044; Jul. 2012.

Liu, et al., "Recognizing Named Entities in Tweets," In Proceedings of ACL-HLT; 1:359-367; Jun. 2011.

Lui, M. and Baldwin, T., "Accurate Language Identification of Twitter Messages," Proceedings of the 5$^{th}$ Workshop on Language Analysis for Social Media (LASM)© EACL 2014; pp. 17-25; Apr. 26-30, 2014.

Lui, et al., "Automatic Detection and Language Identification of Multilingual Documents," Transactions of the Association for Computational Linguistics, 2:27-40; Feb. 2014.

Lui, M. and Baldwin, T., "Cross-domain Feature Selection for Language Identification," Proceedings of the 5$^{th}$ International Joint Conference on Natural Language Processing; pp. 553-561; Nov. 8-13, 2011.

Lui, M. and Baldwin, T., "langid.py: An Off-the-shelf Language Identification Tool," Proc. of the 50$^{th}$ Annual Meeting of the Association for Computational Linguistics; pp. 25-30; Jul. 8-14, 2012.

Monteith, et al., "Turning Bayesian Model Averaging Into Bayesian Model Combination," Proceedings of the International Joint Conference on Neural Networks IJCNN'11; Jul. 31-Aug. 5, 2011; 7pgs.

Papineni, K., et al. "BLEU: A Method for Automatic Evaluation of Machine Translation," Proc. 40th annual Meeting on Assoc. for Computational Linguistics (ACL); Jul. 2002; pp. 311-318.

Qureshi et al., Collusion Detection and Prevention with FIRE+ Trust and Reputation Model, 2010, IEEE, Computer and Information Technology (CIT), 2010 IEEE 10th International Conference, pp. 2548-2555; Jun. 2010.

Ritter, et al., "Named Entity Recognition in Tweets: An Experimental Study," In Proceedings of EMNLP;pp. 1524-1534; Jul. 2011.

Rouse, M., "Parallel Processing," Search Data Center.com; Mar. 27, 2007; 2pgs.

Tromp, E. and Pechenizkiy, M., "Graph-based n-gram Language Identification on Short Texts," In Proceedings of the 20th Machine Learning Conference of Belgium and The Netherlands; May 2011; 8pgs.

Vatanen, et al., "Language Identification of Short Text Segments with n-gram Models," In Proceedings of LREC; pp. 3423-3430; May 2010.

Vogel, J. and Tresner-Kirsch, D., "Robust Language Identification in Short, Noisy Texts: Improvements to LIGA," In Proceedings of the 3rd International Workshop on Mining Ubiquitous and Social Environments; pp. 1-9; Jul. 2012.

Xia, F. and Lewis, W.D., "Applying NLP Technologies to the Collection and Enrichment of Language Data on the Web to Aid Linguistic Research," Proc. of the EACL 2009 Workshop on Language Tech. and Resources for Cultural Heritage, Social Sciences, Humanities, and Education—LaTech—Shelt&R 2009; pp. 51-59; Mar. 2009.

"Arabic script in Unicode," accessed on the internet at <http://en.wikipedia.org/wiki/Arabic_script_in_Unicode>; downloaded Dec. 22, 2014; 18pgs.

"Chromium-compact-language-detector," accessed on the internet at <https://code.googie.com/p/chromium-compact-language-detector/>; downloaded Dec. 22, 2014; 1 pg.

"CJK Unified Ideographs (Unicode block)," accessed on the internet at <http://en.wikipedia.org/wiki/CJK_Unified_Ideographs_(Unicode block)>; downloaded Dec. 22, 2014; 1 pg.

"CJK Unified Ideographs," accessed on the internet at <http://en.wikipedia.org/wiki/CJK_Unified_Ideographs>, downloaded Dec. 22, 2014; 11 pgs.

"cld2," accessed on the internet at <https://code.google.com/p/cld2/>; downloaded Dec. 22, 2014; 2pgs.

"Cyrillic script in Unicode," accessed on the internet at <http://en.wikipedia.org/wiki/Cyrillic_script_in_Unicode>; downloaded Dec. 22, 2014; 22pgs.

"Detect Method," accessed on the internet at <http://msdn.microsoft.com/enus/library/ff512411.aspx>; downloaded Dec. 22, 2014; 5pgs.

"GitHub," accessed on the internet at <https://github.com/feedbackmine/language_detector>; downloaded Dec. 22, 2014; 1pg.

"Google Translate API," accessed on the internet at <https://cloud.qooqle.com/translate/v2/using_rest>; downloaded Dec. 22, 2014; 12pgs.

"Idig (Language Detection with Infinity Gram)," accessed on the internet at <https://github.com/shuyo/Idig>, downloaded Dec. 22, 2014; 3pgs.

"Language identification," accessed on the internet at <http://en.wikipedia.org/wiki/Language_identification>; downloaded Dec. 22, 2014; 5pgs.

"Languages and Scripts, CLDR Charts," accessed on the internet at <http://www.unicode.org/cldr/charts/latest/supplemental/languages_and_scripts.html>, downloaded Dec. 22, 2014; 23pgs.

"Latin Script in Unicode," accessed on the internet at <http://en.wikipedia.org/wiki/Latin_script_in_Unicode>; downloaded Dec. 22, 2014; 5pgs.

"Mimer SQL Unicode Collation Charts," accessed on the internet at <http://developer.mimer.com/charts/index.html>; downloaded Dec. 22, 2014; 2pgs.

"Multi Core and Parallel Processing," accessed on the internet at stackoverflow.com/questions/1922465/multi-core-and-parallel-processing, published Dec. 17, 2009; downloaded on Jun. 30, 2015; 2pgs.

(56) References Cited

OTHER PUBLICATIONS

"Scripts and Languages," accessed on the internet at <http://www.unicode.org/cldr/charts/latest/supplemental/scripts_and_languages.html>, downloaded Dec. 22, 2014; 23pgs.
"Supported Script," accessed on the internet at <http://www.unicode.org/standard/supported.html>; downloaded Dec. 22, 2014; 3pgs.
"Unicode Character Ranges," accessed on the internet at <http://jrgraphix.net/research/unicode_blocks.php>; downloaded Dec. 22, 2014; 1pg.
"Uscript.h File Reference," accessed on the internet at <http://icuproject.org/apiref/icu4c/uscript_8h.html>, downloaded Dec. 22, 2014; 34pgs.
U.S. Appl. No. 15/267,595, filed Sep. 16, 2016, Systems and Methods for Multi-User Multi-Lingual Communications, Leydon, et al.
U.S. Appl. No. 14/679,224, filed Apr. 6, 2015, Systems and Methods for Multi-User Multi-Lingual Communications, Orsini, et al.
U.S. Appl. No. 14/985,946, filed Dec. 31, 2015, Systems and Methods for Multi-User Multi-Lingual Communications, Orsini, et al.
U.S. Appl. No. 15/076,249, filed Mar. 21, 2016, Systems and Methods for Incentivizing User Feedback for Translation Processing, Leydon, et al.
U.S. Appl. No. 15/161,913, filed May 23, 2016, Systems and Methods for Language Detection, Bojja, et al.
U.S. Appl. No. 15/283,646, filed Oct. 3, 2016, Systems and Methods for Language Detection, Bojja, et al.
U.S. Appl. No. 14/990,540, filed Jan. 7, 2016, Named Entity Recognition on Chat Data, Bojja, et al.
Extended European Search Report of the EPO in EP2954522; Sep. 7, 2016; 7pgs.

* cited by examiner

Communication Transformation and Translation (CTT) System
114

Communication Transformation and Translation (CTT) Control Module
202

Communication Transformation and Translation (CTT) Communications Module
204

Language Module
206

Transformation Module
208

Translation Data Store
210

Translation Application Programming Interface (API) Module
212

SYSTEMS AND METHODS FOR MULTI-USER MULTI-LINGUAL COMMUNICATIONS

BACKGROUND

1. Technical Field

The present invention(s) generally relate to communications and, more particularly, communications across the world involving multiple users and multiple languages.

2. Description of Related Art

Before the advent of machine-based language translations (hereafter, "machine translations"), translation between two languages was only possible via intervention or interpretation by a person educated in both languages. In contrast, typical machine translators operate based on statistical/stochastic analysis of context and grammar, usually without need of human intervention/interpretation.

Typical machine translation is often error prone, particularly where the text to be translated has a minimal context. Text having minimal context is often found in conversations, which employ brief sentence construction. Additionally, machine translations often have trouble with abbreviations, acronyms, diminutives, colloquial words/phrases, proper nouns, and common nouns, which are also commonly found in conversational text.

SUMMARY

Various embodiments described herein provide for systems and methods that relate to multi-lingual communications between multiple users, possibly where the users are at two or more client systems. Modes of communications facilitated by embodiments may include Internet-based chat (e.g., Apple® iMessage, Windows® Live Messenger, etc.), e-mail (e.g., embedded forum messaging, Yahoo® mail, RFC 5322, etc.), text-based mobile phone communications (e.g., SMS messages or MMS messages), postings to online forums (e.g., postings to a web-based hobby forum), and postings to online social media services (e.g., Twitter®, Facebook®, etc.). For example, systems and methods may implement a multi-lingual, multi-user chat system.

For some embodiments, the method provided comprises identifying a first language and a second language, receiving an initial message in the first language from a first person at a first chat client system who communicates in the first language, and querying a data store for a first corresponding message, in the second language, that is based on the initial message in the first language. If the data store includes the first corresponding message, the method may then assist in sending the corresponding message to a second person at a second chat client system who communicates in the second language. Depending on the embodiment, the initial message may comprise text, an emoticon, ASCII-based art, or other content suitable or customary for a human-readable message sent over a network. Additionally, the initial message may be part of a larger message being communicated between chat client systems (e.g., the initial message is one sentence in a multi-sentence message).

If the data store does not include the first corresponding message, the method may utilize a transformation engine to attempt to transform at least a portion of the initial message to a transformed message in the first language. Using the transformed message, the method may then query the data store for a second corresponding message, in the second language, that is based on the transformed message.

For certain embodiments, the system or method may attempt transforming the initial message using a series of transformation operations before querying the data store is queried for a second corresponding message that is based on the transformed message. Alternatively, in some embodiments, the system or method may perform the transformation and query iteratively, whereby the initial message is transformed using a subset of available transformation operations, the data store is queried for a second corresponding message based on the resulting transformed message, and if a second corresponding message is not identified, another iteration of transformation and query is performed (e.g., the resulting transformed message is further transformed using another subset available transformation operations, and the data store is queried for a second corresponding message based on the resulting transformed message). In some such embodiments, the subset of transformation operations applied in each iteration may be applied to the initial message or may be applied to the latest resulting transformed message.

Eventually, the method may assist in translating the initial message or the transformed message to a corresponding message in the second language. In some embodiments, the initial message may be translated to the corresponding message when the first corresponding message for the initial message is not in the data store and the transformation engine does not transform at least a portion of the initial message. Additionally, in various embodiments, the transformed message may be translated to the corresponding message when: the first corresponding message for the initial message is not in the data store; the transformation engine results in a transformed message that contains the transformation of at least a portion of the initial message; and the data store does not include the second corresponding message for the transformed message.

Depending on the embodiment, transforming the portion of the initial message may comprise identifying a chatspeak word or phrase (e.g., 'lol,' 'gr8t,') in the initial message and replacing the chatspeak word or phrase with a non-chatspeak word or phrase, performing a spelling check on the portion of the initial message, or identifying an abbreviation in the portion of the initial message and replacing the abbreviation with a word or a phrase corresponding to (e.g., represented by) the abbreviation (e.g., 'CA' with 'California,' or 'brb' to 'be right back').

In addition, transforming the portion of the initial message may comprise identifying an acronym in the portion of the initial message and replacing the acronym with a word or a phrase corresponding to (e.g., represented by) the acronym (e.g., 'USA'), or identifying a colloquial word or phrase in the portion of the initial message and replacing the colloquial word or phrase with a word or a phrase representing the colloquial word or phrase. Furthermore, transforming the portion of the initial message may comprise identifying a profane word or phrase in the portion of the initial message and replacing the profane word or phrase with a non-profane word or a phrase (e.g., that is representative of the profane word or phrase) or removing the profane word or phrase from the initial message.

For some embodiments, transforming the portion of the initial message comprises flagging the portion of the initial message to not be translated. For instance, wherein a certain portion of the initial message comprises a proper noun, a common noun, a diminutive, an abbreviation, or an acronym, the method may flag that certain portion such that it is not translated in subsequent operations.

Certain embodiments provide for a system comprising various components that are configured to perform various operations described herein. Likewise, certain embodiments provides for a computer program product comprising computer instruction codes configured to cause the computer system to perform various operations described herein.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

FIG. 2 is a block diagram illustrating an exemplary communication transformation and translation system in accordance with various embodiments.

DETAILED DESCRIPTION

Figure 1:
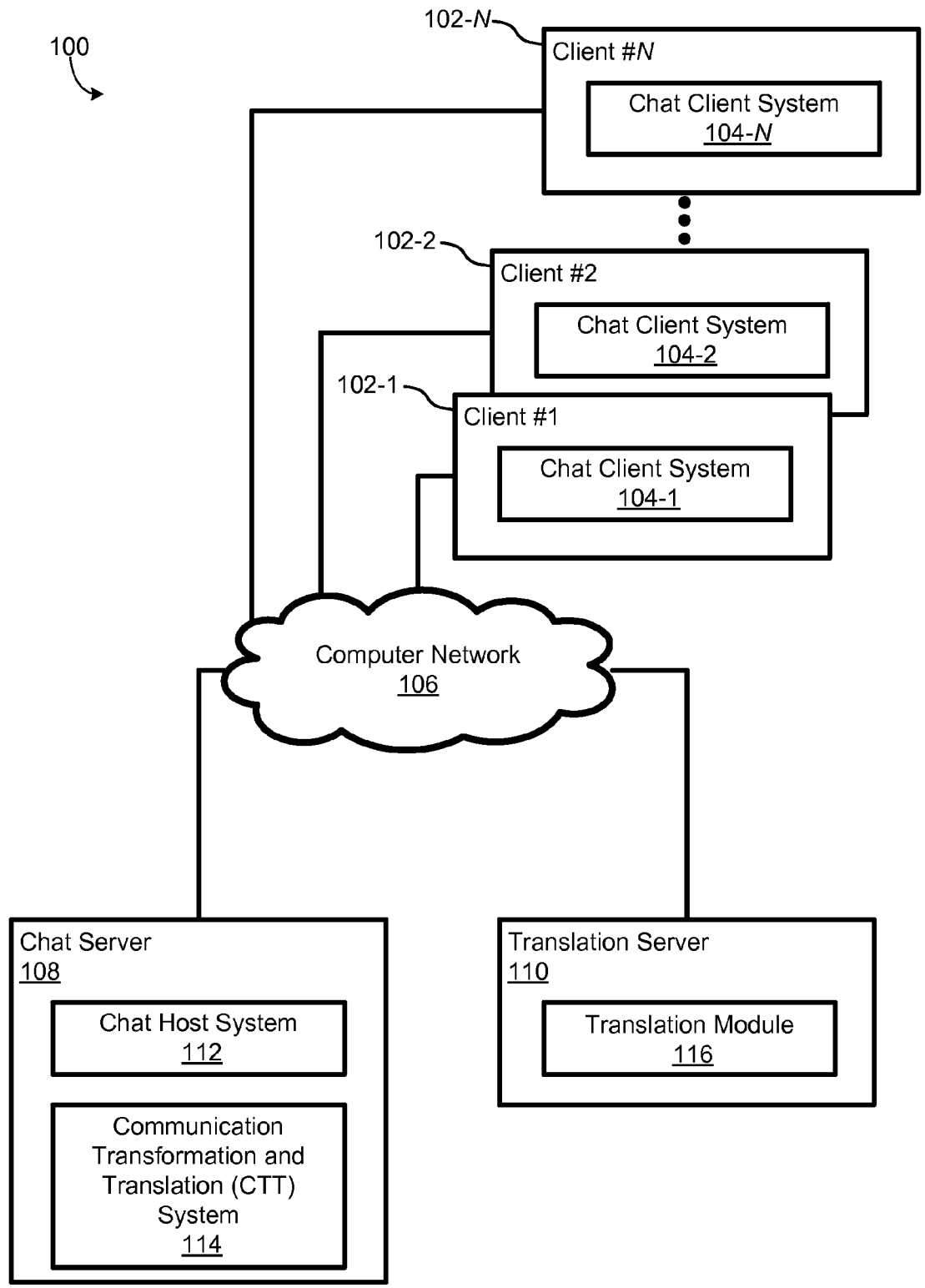
FIG. 1 is a block diagram illustrating an exemplary environment utilizing a multi-lingual communications system in accordance with various embodiments.

Various embodiments described herein relate to and facilitate multi-lingual communications. The systems and methods of some embodiments may enable multi-lingual communications through different modes of communications including, for example, Internet-based chat (e.g., Apple® iMessage, Windows® Live Messenger, etc.), e-mail (e.g., embedded forum messaging, Yahoo® mail, RFC 5322, etc.), text-based mobile phone communications (e.g., SMS messages or MMS messages), postings to online forums (e.g., postings to a web-based hobby forum), postings to online social media services (e.g., Twitter®, Facebook®, etc.), and the like. Certain embodiments may also be used to translate transcripts of communications or conversations that took place in the past (e.g., deposition transcripts or chat history). Various embodiments may implement communications systems and methods that translate text between two or more languages (e.g., spoken), while handling/accommodating for one or more of the following in the text: specialized/domain-related jargon (e.g., chatspeak), abbreviations, acronyms, proper nouns, common nouns, diminutives, colloquial words or phrases, and profane words or phrases. For example, some systems and methods described herein may be utilized in connection with a chat system, such as those used in massive-multiplayer online (MMO) games, which tend to have users that chat in different foreign languages. Through certain embodiments, the chat dialogue between two or more users can be transparently translated and presented to each user in their respective native language or language of choice. Additionally, through the use of a multi-tiered/multi-module transformation process, certain embodiments may facilitate faster translation of communication between two or more users (e.g., in their respective native languages) than otherwise possible by traditional translation systems alone (e.g., translation in a matter of microseconds).

According to some embodiments, a system or method may perform translation from chatspeak in a first language, such as English, to chatspeak in a second language, such as French. In another example, a system or method may perform transformation from chatspeak in the first language (e.g., English) to formal speak in the first language (e.g., English), before attempting translation to the second language (e.g., French). Some embodiments may achieve such text translations by first querying a data store (e.g., translations cache), which may contain translations manually entered by a human operator or translations based on previously performed by a translation system (e.g., historical translations performed by an embodiment). Embodiments may attempt to transform one or more portions of the text (e.g., process one or more of the following within the text: chatspeak, acronyms, abbreviations, proper nouns, common nouns, colloquialisms, and profanity) to make it more suitable for accurate text translation. For example, certain embodiments may transform a given text to account for (current or past) idiomatic language use across different languages. Embodiments may reattempt querying the data store after transformation of the portions of the text. If this translation lookup reattempt fails, embodiments may attempt to translate the text (which may have been transformed) using a machine translation service (e.g., third-party, cloud-based translation service, such as Google® translate).

Embodiments may attempt to transform a translated piece of formal text to chatspeak in the new language (e.g., transform French formal speak to French chatspeak) to further refine the translation of the text eventually produced. Accordingly, certain embodiments facilitate chat translation between chatspeak in a first language (e.g., English) to chatspeak in a second language (e.g., Russian, French, Spanish, Chinese, Hindi, etc.).

Some embodiments may help reduce or avoid the need for using machine translations (thereby reducing time, cost, and other overhead associated with machine translations), and may facilitate accurate translations of text having minimal context or comprising short sentence structure. Where the machine translation is facilitated by a third-party service or over a secure network connection (e.g., Secure-Socket Layer

[SSL] connection), the cost or overhead avoided by certain embodiments may be significant.

As understood herein, "transformation" means manipulating a first text segment, in a first language, to form a second text segment in the first language. The resulting second text segment may also be referred to herein as the "transformed text." "Translation" will be understood to mean converting a text segment in a first language to a corresponding text segment in a second language.

As also understood herein, a "transformed translation" means translation of a text segment (from a first language to a second language) that has already been transformed in accordance with embodiments described herein (e.g., transformed from chatspeak text in a first language to formal text in the first language). An "untransformed translation" will be understood to mean a translation of a text segment (from a first language to a second language) before the text segment has been transformed in accordance with embodiments described herein.

Various embodiments may implement different transformation/translation strategies, with certain strategies being well suited for particular translation applications. For example, for particular chat system applications, the transformation strategy implemented may comprise applying the following set of transformation-related modules in the order listed: chatspeak module, acronym module, proper noun module, common noun module, colloquialism module, spelling check module, abbreviation module, and profanity module. Generally, the transformation/translation strategy employed determines which transformation operations are performed, when the transformation operations are performed in the overall translation process (e.g., transformation performed before or after machine translation), or in what order the transformation operations are performed (e.g., precedence or priority of transformation operations). The transformation/translation strategy may also determine what translations are pre-populated into the data store (e.g., translations can be stored in a translation "cache" to speed up the overall process) and when translation caches are utilized in the overall translation process. For certain embodiments, the transformation/translation strategy employed may be dynamically determined based on the conditions of the environment in which the embodiments are used. For example, where a chat system is experiencing a heavier load of users than usual, the transformation/translation strategy may switch to one that lessens the processing burden of the chat system (e.g., relies more on machine translations rather than on the data store).

FIG. 1 is a block diagram illustrating an exemplary environment 100 utilizing a multi-lingual system in accordance with various embodiments. As shown in FIG. 1, the exemplary environment 100 comprises clients 102-1 through 102-N (hereafter, collectively referred to as "clients 102" or "client 102"), a chat server 108, and a translation server 110, each of which may be communicatively coupled with each other through a computer network 106. In accordance with some embodiments, the computer network 106 may be implemented or facilitated using one or more local or wide-area communications networks, such as the Internet, WiFi networks, WiMax networks, private networks, public networks, and the like. Depending on the embodiment, some or all of the communication connections with the computer network 106 may utilize encryption (e.g., Secure Sockets Layer [SSL]) to secure information being transferred between the various entities shown in the exemplary environment 100.

Each of the clients 102, the chat server 108, and the translation server 110 may be implemented using one or more digital devices, which may be similar to the digital devices discussed later with respect to FIG. 12. For instance, the client 102-1 may be any form of computing device capable of receiving user input (e.g., configured for user interaction), capable of providing a client user interface that facilitates communications with one or more other clients (e.g., any of clients 102-2 through 102-N), and capable of communicating with the chat server 108 through the computer network 106. Such computing devices may include a mobile phone, a tablet computing device, a laptop, a desktop computer, personal digital assistant, a portable gaming unit, a wired gaming unit, a thin client, a set-top box, a portable multi-media player, or any other type of network accessible user device known to those of skill in the art. Further, one or more of the chat server 108 and the translation server 110 may comprise of one or more servers, which may be operating on or implemented using one or more cloud-based services (e.g., System-as-a-Service [SaaS], Platform-as-a-Service [PaaS], or Infrastructure-as-a-Service [IaaS]).

The clients 102 may be configured to communicatively connect with the chat server 108, which provides or otherwise facilitates chat sessions between the clients 102. Each of the clients 102-1 through 102-N may comprise a chat client system (104-1 through 104-N, respectively) that enables a user at each of the clients 102 to access to the chat session through the chat server 108. Additionally, depending on the embodiment, each of the chat client systems 104-1 through 104-N (hereafter, collectively referred to as "chat client systems 104" or "chat client system 104") may be implemented as a standalone chat application, as a chat feature embedded in non-chat application (e.g., video game), or through a chat service accessible at the client through a web browser. Those skilled in the art will appreciate that for some embodiments the chat client systems 104 may be non-heterogeneous with respect to one another and still be capable of establishing a chat session between them. The chat client systems 104 may be capable of receiving chat input (e.g., a chat message) from their respective users in a language (and corresponding character set) selected by the user (e.g., based on user settings or preferences), and transmitting the chat input to the chat server 108 to be relayed to another user (e.g., another user at another chat client system). The chat client systems 104 may also be capable of receiving chat output (e.g., chat session dialogue) from the chat server 108 (e.g., from another user at another chat client system), and displaying the received chat output in a language (and corresponding character set) selected by the user (e.g., based on user settings or preferences).

Through the use of some embodiments, the translation of the chat dialogue may be transparent to the users as dialogue is passed between the chat client systems 104. Accordingly, for some embodiments, all chat dialogue presented at a given chat client system 104 may be in a language native to (or selected by) the user at that given chat client system 104, irrespective of what language is being by users, at other chat client systems 104 that are contributing to the same chat dialogue. For example, where the user at the chat client system 104-1 and the user at the chat client system 104-2 are contributing to the same chat dialogue (i.e., involved in the same chat session), the user at the chat client system 104-1 may have chosen to enter and receive chat dialogue in English while the user at the chat client system 104-2 may have chosen to enter and receive chat dialogue in Russian. Though the users at the client systems 104-1 and 104-2 will see the same chat content, the chat dialogue will be presented in their respectively chosen languages.

As shown, the chat server 108 may comprise a chat host system 112 configured to established and/or facilitate chat sessions between the chat client systems 104, and a communication transformation and translation (CTT) system 114 configured to perform transformation and/or translation operations in accordance with the various systems and methods described herein. For some embodiments, the chat client systems 104 may establish a chat session with each other through the chat host system 112, and the chat host system 104 may utilize the features of the CTT system 114 in facilitating the transparent translation of chat dialogue between the chat client systems 104. Those skilled in the art will appreciate that for some embodiments, the chat host system 112 and the CTT system 114 may be part of separate servers, and that the entity operating the chat host system 112 may be different from the entity operating the CTT system 114. For instance, the chat host system 112 may be a third-party chat host system that utilizes the services of the CTT system 114.

As also shown, the translation server 110 may comprise a translation module 116 configured to receive and service requests for machine text translation. In accordance with some embodiments, the CTT system 114 may utilize the operations/services of the translation module 116 in performing machine translations of texts. The CTT system 114 may use of one or more translation application programming interfaces (APIs) to obtain access to the services provided by the translation module 116. Depending on the embodiment, the translation module 116 (and the server 110 on which it resides) may be operated by a third-party, such as Google®, which may offer the machine translation services free of charge or for a fee. Though the translation module 116 is shown to be a component operating on a server separate from the CTT system 114, those skilled in the art will appreciate that, for some embodiments, the translation module 116 may operating on the same server as the CTT system 114 and/or may be an integrated component of the CTT system 114.

FIG. 2 is a block diagram illustrating an exemplary communication transformation and translation system 114 in accordance with various embodiments. As shown, the CTT system 114 may comprise a communication transformation and translation (CTT) control module 202, a communication transformation and translation (CTT) communications module 204, a language module 206, a transformation module 208, a translation data store 210, and a translation application programming interface (API) module 212. The CTT control module 202 may be configured to control and/or orchestrate performance of various operations within the CTT system 114 as the CTT system 114 performs transformation or translation operations in accordance with some systems and methods described herein. For some embodiments, the CTT control module 202 may control the operation of other components of the CTT system 114, such as the CTT communications module 204, the language module 206, the transformation module 208, the translation data stores 210, and the translation API module 212.

The CTT communications module 204 may be configured to facilitate communications between the CTT system 114 and systems and components external to the CTT system 114, such as the chat server 108 and/or the translation server 110. Accordingly, through the CTT communications module 204, the CTT system 114 may receive the chat dialogue (comprising one or more chat messages) to be transformed or translated by the CTT system 114, and may output the translated chat dialogue that results from the CTT system 114.

The language module 206 may be configured to identify the one or more languages used in connection with chat dialogue received by the CTT system 114. For some embodiments, the language module 206 may identify the language through analysis of the content of the chat dialogue received, and/or obtaining language preference/settings information from the respective chat client systems (e.g., chat client systems 104) involved with the chat dialogue received.

The transformation module 208 may be configured to perform transformation operations on chat dialogue (comprising one or more chat messages), received by the CTT system 114, in accordance with some systems and methods described herein. In accordance with some embodiments, the transformation operations performed by the transformation module 208 may include, without limitation, those relating to chatspeak, acronyms, abbreviations, proper nouns, common nouns, colloquialisms, and profanity. Additional details of the transformation module 208 are discussed in FIG. 3.

The translation data store 210 may be configured to store and subsequently provide previously translated text to the CTT system 114 as the CTT system 114 performs transformed translations and untransformed translations in accordance with the some system and methods described herein. As described herein, the translation data store 210 may operate as a cache for translations previously performed by the CTT system 114, and/or may store translations manually entered and stored by a human operator (e.g., by way of a translation training system). For some embodiments, the translation data store 210 may be populated with translations that would speed up the performance of the CTT system 114 with respect to certain chat contexts. For example, where the CTT system 114 is utilized in conjunction with a chat system associated with an MMO game, the translation data store 210 may be populated (e.g., by the operator of the CTT system 114) with (transformed and untransformed) translations relating specifically to the MMO game. For certain embodiments, the multi-tiered/multi-module approach of transforming text used by the transformation module 208 is particularly well suited for handling chat text in MMO games, which by nature tends to be complex.

Depending on the embodiment, the data store 210 may store either untransformed translations (e.g., <English Formal>'you'→<French Formal>'vous'), transformed translations (e.g., <English Chatspeak>'u'→<French Formal>'vous'), or both. For some embodiments, the translation data store 210 may store translations such that corresponding chat messages may be identified using hash values/tags. For instance, to store a Spanish translation for an original message in English, the Spanish translation may be stored based on a hash value of the English message, thereby enabling the Spanish translation to be later located and obtained using the hash value of the English message. Those skilled in the art will appreciate that for some embodiments, the translation data store 210 may comprise a separate data store for translations between two specific languages. Accordingly, when a chat message is being transformed/translated between English and French, a corresponding data English-French data store may be utilized for operations relating to the translation data store 210.

The translation API module 212 may be configured to provide the CTT system 114 with access to machine translation services provided external to the CTT system 114

(e.g., by the translation module 116 of the translation server 110). As described herein, the translation API module 212 may be utilized by the CTT system 114 when a translation is not located in the translation data store 210.

Figure 3:
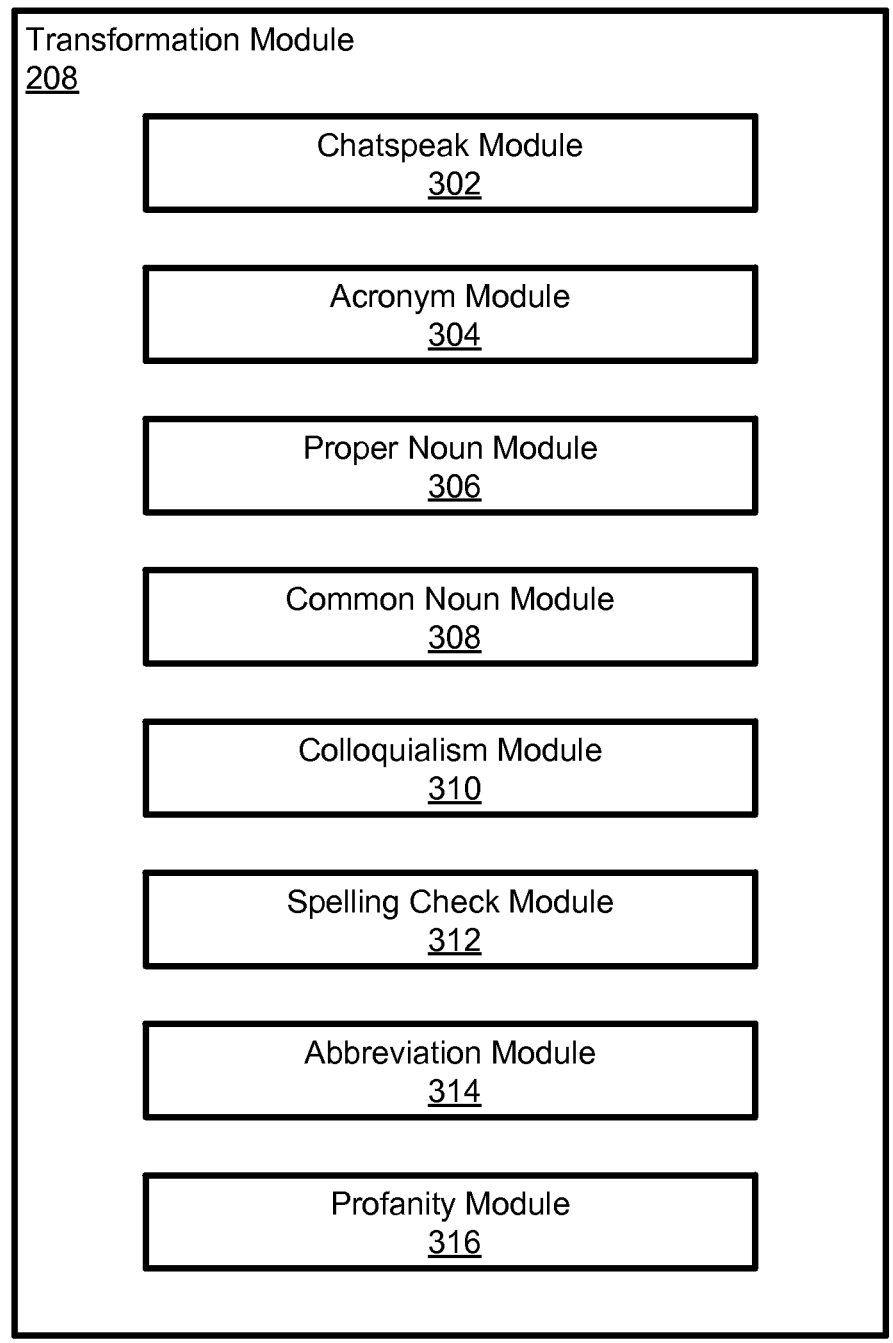
FIG. 3 is a block diagram illustrating an exemplary transformation module in accordance with various embodiments.

FIG. 3 is a block diagram illustrating an exemplary transformation module 208 in accordance with various embodiments. As shown, the transformation module 208 may comprise a chatspeak module 302, an acronym module 304, a proper noun module 306, a common noun module 308, a colloquialism module 310, a spelling check module 312, an abbreviation module 314, and/or a profanity module 316. According to some embodiments, during operation the transformation module 208 may process a chat message in whole or in parts (e.g., breaks the message into tokens or logical portions and then processes those tokens/portions). In some embodiments, various modules of the transformation module 208 may be called in parallel.

The chatspeak module 302 may be configured to identify one or more words or phrases in a chat message that are associated with chat jargon (i.e., chatspeak), and may be further configured to suggest replacement (e.g., corresponding formal/i.e., non-chatspeak) words or phrases for the identified words or phrases. In some embodiments, the chatspeak module 302 may flag an identified chatspeak word or phrase to be skipped or otherwise ignored during a subsequent machine translation (e.g., by the translation module 116). Additionally, in some embodiments, an identified chatspeak word or phrase may be flagged for later review and disposition by a human operator (e.g., an administrator of the CTT system 114). In order to identify a chatspeak word or phrase and/or its corresponding (formal) word or phrase, some embodiments may utilize a dataset (e.g., stored on a data store) comprising chatspeak words or phrases and/or mappings between chatspeak words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. For example, the chatspeak module 302 may employ statistical machine translation in its functionality. For some embodiments, the statistical machine translation employed may be trained using parallel texts and/or using phrase-level pairs extracted from transformations that preserve contextual information and/or add grammar to an otherwise ungrammatical sentence. The result from the chatspeak module 302 may comprise a chatspeak word or phrase flagged by the chatspeak module 302 to be ignored, a suggested replacement, or a non-chatspeak word or phrase inserted into the message by the chatspeak module 302 (e.g., in place of the identified chatspeak word or phrase). Depending on the embodiment, the message that results from the chatspeak module 302 may be provided to another transformation module (in the transformation module 208) for further processing or the suggested replacement may be provided to the CTT control module 202 to determine if the message transformed by the chatspeak module 302 is in the data store 210.

The acronym module 304 may be configured to identify one or more acronyms in a chat message, and may be further configured to suggest replacement words or phrases corresponding to (e.g., represented by) the acronyms. In some embodiments, the acronym module 304 may flag an identified acronym to be skipped or otherwise ignored during a subsequent machine translation (e.g., by the translation module 116). Additionally, in some embodiments, an identified acronym may be flagged for later review and disposition by a human operator (e.g., an administrator of the CTT system 114). In order to identify an acronym and/or its corresponding word or phrase, some embodiments may utilize a dataset (e.g., stored on a data store) comprising acronyms and/or mappings between acronyms and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the acronym module 304 may comprise an acronym flagged by the acronym module 304 to be ignored, a suggested replacement, or a word or phrase inserted into the message by the acronym module 304 (e.g., in place of the identified acronym). Depending on the embodiment, the message that results from the acronym module 304 may be provided to another transformation module (in the transformation module 208) for further processing or the suggested replacement may be provided to the CTT control module 202 to determine if the message transformed by the acronym module 304 is in the data store 210.

The proper noun module 306 may be configured to identify one or more proper nouns in a chat message, and may be further configured to suggest replacement words or phrases corresponding to (e.g., represented by) the proper nouns. In some embodiments, the proper noun module 306 may flag an identified proper noun to be skipped or otherwise ignored during a subsequent machine translation (e.g., by the translation module 116). Additionally, in some embodiments, an identified proper noun may be flagged for later review and disposition by a human operator (e.g., an administrator of the CTT system 114). In order to identify a proper noun and/or its corresponding word or phrase, some embodiments may utilize a dataset (e.g., stored on a data store) comprising proper nouns (e.g., well-known proper nouns such as Disneyland®, or common names for individuals) and/or mappings between proper nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the proper noun module 306 may comprise a proper noun flagged by the proper noun module 306 to be ignored, a suggested replacement, or a word or phrase inserted into the message by the proper noun module 306 (e.g., in place of the identified proper noun). Depending on the embodiment, the message that results from the proper noun module 306 may be provided to another transformation module (in the transformation module 208) for further processing or the suggested replacement may be provided to the CTT control module 202 to determine if the message transformed by the proper noun module 306 is in the data store 210.

The common noun module 308 may be configured to identify one or more common nouns in a chat message, and may be further configured to suggest replacement words or phrases corresponding to (e.g., represented by) the common nouns. In some embodiments, the common noun module 308 may flag an identified common noun to be skipped or otherwise ignored during a subsequent machine translation (e.g., by the translation module 116). Additionally, in some embodiments, an identified common noun may be flagged for later review and disposition by a human operator (e.g., an administrator of the CTT system 114). In order to identify a common noun and/or its corresponding word or phrase, some embodiments may utilize a dataset (e.g., stored on a data store) comprising common nouns and/or mappings between common nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the common noun module 308 may comprise a common noun flagged by the common noun module 308 to be ignored, a suggested replacement, or a word or phrase inserted into the message by the common noun module 308 (e.g., in place of the identified common noun). Depending on the embodiment, the message that results from the common noun module 308 may be provided to another transformation module (in the transformation module 208) for further processing or the suggested replacement may be provided to the CTT control module 202 to determine if the message transformed by the common noun module 308 is in the data store 210.

The colloquialism module 310 may be configured to identify one or more colloquial words or phrases in a chat message, and may be further configured to suggest replacement (e.g., corresponding formal/i.e., non-colloquial) words or phrases for the identified words or phrases. In some embodiments, the colloquialism module 310 may flag an identified colloquial word or phrase to be skipped or otherwise ignored during a subsequent machine translation (e.g., by the translation module 116). Additionally, in some embodiments, an identified colloquial word or phrase may be flagged for later review and disposition by a human operator (e.g., an administrator of the CTT system 114). In order to identify a colloquial word or phrase and/or its corresponding (formal) word or phrase, some embodiments may utilize a dataset (e.g., stored on a data store) comprising colloquial words or phrases and/or mappings between colloquial words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the colloquialism module 310 may comprise a colloquial word or phrase flagged by the colloquialism module 310 to be ignored, a suggested replacement, or a non-colloquial word or phrase inserted into the message by the colloquialism module 310 (e.g., in place of the identified colloquial word or phrase). Depending on the embodiment, the message that results from the colloquialism module 310 may be provided to another transformation module (in the transformation module 208) for further processing or the suggested replacement may be provided to the CTT control module 202 to determine if the message transformed by the colloquialism module 310 is in the data store 210.

The spelling check module 312 may be configured to identify one or more misspelled words or phrases in a chat message, and may be further configured to suggest replacement (e.g. corrected) words or phrases for the identified words or phrases. For example, the spelling check module 312 may be configured to automatically correct the words or phrases with the suggested replacement words or phrases. In some embodiments, the spelling check module 312 may flag an identified misspelled word or phrase to be skipped or otherwise ignored during a subsequent machine translation (e.g., by the translation module 116). Additionally, in some embodiments, an identified misspelled word or phrase may be flagged for later review and disposition by a human operator (e.g., an administrator of the CTT system 114). In order to identify a misspelled word or phrase and/or its corresponding (corrected) word or phrase, some embodiments may utilize a dataset (e.g., stored on a data store) comprising misspelled words or phrases and/or mappings between misspelled words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the spelling check module 312 may comprise a misspelled word or phrase flagged by the spelling check module 312 to be ignored, a suggested replacement, or a corrected word or phrase inserted into the message by the spelling check module 312 (e.g., in place of the misspelled word or phrase). Depending on the embodiment, the message that results from the spelling check module 312 may be provided to another transformation module (in the transformation module 208) for further processing or the suggested replacement may be provided to the CTT control module 202 to determine if the message transformed by the spelling check module 312 is in the data store 210.

The abbreviation module 314 may be configured to identify one or more abbreviations in a chat message, and may be further configured to suggest replacement words or phrases corresponding to (e.g., represented by) the abbreviations. In some embodiments, the abbreviation module 314 may flag an identified abbreviation to be skipped or otherwise ignored during a subsequent machine translation (e.g., by the translation module 116). Additionally, in some embodiments, an identified abbreviation may be flagged for later review and disposition by a human operator (e.g., an administrator of the CTT system 114). In order to identify an abbreviation and/or its corresponding word or phrase, some embodiments may utilize a dataset (e.g., stored on a data store) comprising abbreviations and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the abbreviation module 314 may comprise an abbreviation flagged by the abbreviation module 314 to be ignored, a suggested replacement, or a word or phrase inserted into the message by the abbreviation module 314 (e.g., in place of the identified abbreviation). Depending on the embodiment, the message that results from the abbreviation module 314 may be provided to another transformation module (in the transformation module 208) for further processing or the suggested replacement may be provided to the CTT control module 202 to determine if the message transformed by the abbreviation module 314 is in the data store 210.

The profanity module 316 may be configured to identify one or more profane words or phrases (hereafter, referred to as a "profanity") in a chat message, and may be further configured to suggest replacement words or phrases (e.g., suitable substitute) corresponding to the profanity (e.g., a toned down euphemism). In some embodiments, the profanity module 316 may flag identified profanity to be skipped or otherwise ignored during a subsequent machine translation (e.g., by the translation module 116). Additionally, in some embodiments, identified profanity may be flagged for later review and disposition by a human operator (e.g., an administrator of the CTT system 114). In order to identify profanity and/or its corresponding word or phrase, some embodiments may utilize a dataset (e.g., stored on a data store) comprising profanity and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The result from the profanity module 316 may comprise profanity flagged by the profanity module 316 to be ignored, a suggested replacement, or a word or phrase inserted into the message by the profanity module 316 (e.g., in place of the identified profanity). Depending on the embodiment, the message that results from the profanity module 316 may be provided to another transformation module (in the transformation module 208) for further processing or the suggested replacement may be provided to the CTT control module 202 to determine if the message transformed by the profanity module 316 is in the data store 210.

For some embodiments, one or more various modules of the transformation module 208 may flag one or more portions of the chat message by inserting a predetermined character before and/or after the portion being flagged. For instance, where the chatspeak module 302 flags the word "LOL" in a portion of the chat message, the chatspeak module 302 may insert an predetermined character ("_") before and/or after the word (e.g., "_LOL_") to indicate that the flagged portion should be ignored by the translation module 116.

For some embodiments, the transformation module 208 may perform two or more transformation operations on the initial message in parallel, and in response, each of the two or more transformation operations may return a separate response, from which the transformation module 208 may then select one transformed message for further processing (e.g., to be used in operation 514). Depending on the embodiment, each response may comprise a flagged text portion, a suggested replacement, or a word or phrase inserted into the initial message. Thereafter, the transformed message selected may be according to a priority of selection, which can determine which transformed message is selected for further processing and according to what precedent. In some embodiments, the priority selection may be according to which transformation operation is most likely to generate a transformed message suitable for a subsequent lookup in the translation data store 210) or for subsequent machine translation. Additionally, in some embodiments, the priority of selection may be according to which transformation operation generates the most formal transformed message. The priority of selection may depend on the transformation/translation strategy selected by the embodiment.

The following provides examples of how the transformation module 208 may process a portion of a chat message in accordance with various embodiments. As shown, the transformation module 208 may process a chat message based on tokens or proximal tokens, and may cease processing on a particular token once a transformation is performed.

| Token(s) from a Chat Message | Transformation Processing |
| --- | --- |
| Token = 'USA' | Chatspeak Module ('USA') → Acronym Module ('USA') → Flag for non-translation. |
| Token = 'brb' | Chatspeak Module ('brb') → Acronym Module ('brb') → Proper Noun Module ('brb') → Common Noun Module ('brb') → Colloquialism Module ('brb') → Spelling Check Module('brb') → Abbreviation Module ('brb') → Transform to 'be right back' |
| Token = '9' | Chatspeak Module ('9') → Transform to 'parents watching over shoulder' |
| Token = '99' | Chatspeak Module ('99') → Transform to 'parents stopped watching over shoulder' |
| Proximal tokens = 'go gabe' | Chatspeak Module ('go gabe') → Acronym Module ('go gabe') → Proper Noun Module ('going') → Common Noun Module ('go gabe') → Flag for likely being a common noun. |
| String = 'Your going to attack him?' Token#1 = 'Your' Token#2 = 'going' Token#3 = 'to' Token#4 = 'attack' Token#5 = 'him' | Spelling Check Module ('Your') → Correct with 'You're' based on proximal token 'going' (i.e., using proximal context for spell checking) Chatspeak Module ('going') → Acronym Module ('going') → Proper Noun Module ('going') → Common Noun Module ('going') → Colloquialism Module ('going') → Spelling Check Module('going') → Abbreviation Module ('going') → Profanity Module ('going') → No transform. Chatspeak Module ('to') → Acronym Module ('to') → Proper Noun Module ('to') → Common Noun Module ('to') → Colloquialism Module ('to') → Spelling Check Module('to') → Abbreviation Module ('to') → Profanity Module ('to') → No transform. Chatspeak Module ('attack') → Acronym Module ('attack') → Proper Noun Module ('attack') → Common Noun Module ('attack') → Colloquialism Module ('attack') → Spelling Check Module('attack') → Abbreviation Module ('attack') → Profanity Module ('attack') → No transform. Chatspeak Module ('him') → Acronym Module ('him') → Proper Noun Module ('him') → Common Noun Module ('him') → Colloquialism Module ('him') → Spelling Check Module('him') → Abbreviation Module ('him') → Profanity Module ('him') → No transform. |
| String = 'Sup bro, sup yall?' Token#1 = 'Sup' Token#2 = 'bro' Token#3 = 'sup' Token#4 = 'yall' | Chatspeak Module ('Sup') → Replace with "How is it going." Chatspeak Module ('bro') → Acronym Module ('bro') → Proper Noun Module ('bro') → Common Noun Module ('bro') → Colloquialism Module ('bro') → Spelling Check Module('bro') → Abbreviation Module ('bro') → Replace with "brother" Chatspeak Module ('sup') → Replace with "how is it going." Chatspeak Module ('yall') → Replace with "you all." |

Figure 4:
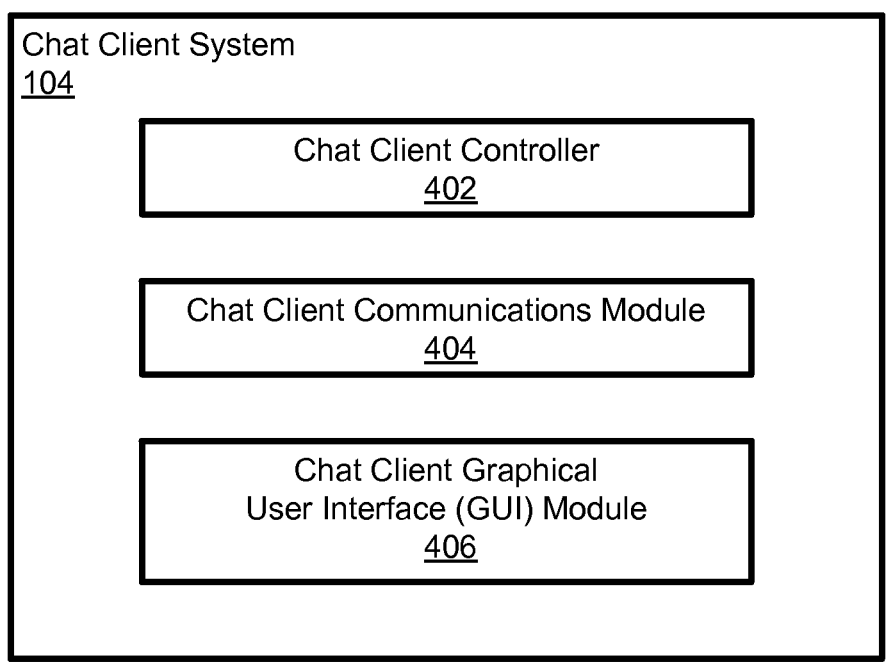
FIG. 4 is a block diagram illustrating an exemplary chat client system in accordance with various embodiments.

FIG. 4 is a block diagram illustrating an exemplary chat client system 104 in accordance with various embodiments. As shown, the chat client system 104 may comprise a chat client controller 402, a chat client communications module 404, and a chat client graphical user interface (GUI) module 406. The chat client control module 402 may be configured to control and/or orchestrate performance of various operations within the chat client system 104 as the chat client system 104 performs chat related operations (e.g., communications chat dialogue with the chat server 108). For some embodiments, the chat client control module 402 may control the operation of other components of the chat client system 104 including, for example, such as the chat client communications module 404, and the chat client GUI module 406.

The chat client communications module 404 may be configured to facilitate communications between the chat client system 104 and systems and components external to the chat client system 104, such as the chat server 108. Accordingly, through the chat client module 404, the chat client system 104 may receive from the chat server 108 the chat dialogue to be presented at the chat client system 104 (e.g., via the chat client GUI module 406), and may send to the chat server the chat dialogue received from the user at the chat client system 104 (e.g., via the chat client GUI module 406).

The chat client GUI module 406 may be configured to provide a user at the chat client system 104 with graphical input/output access to chat sessions with other chat client systems. Accordingly, for some embodiments the chat client GUI module 406 may present a user at the client 102 with a client GUI adapted for receiving user interactions through the client 102. For some embodiments, the chat client GUI module 406 may be configured to present the user with chat dialogue (e.g., as they are received from the chat server 108) in the language of their choice (e.g., according to the user language preferences/settings). Additionally, the chat client GUI module 406 may be configured to receive chat input from the user in the language of their choice (e.g., according to the user language preferences/settings). As described herein, the language used in presenting and receiving the chat dialogue at the chat client system 104 may be different from the language used in presenting and receiving the chat dialogue at another chat client system. More regarding the chat client GUI module 406 is discussed with respect to FIG. 7.

Figure 5:
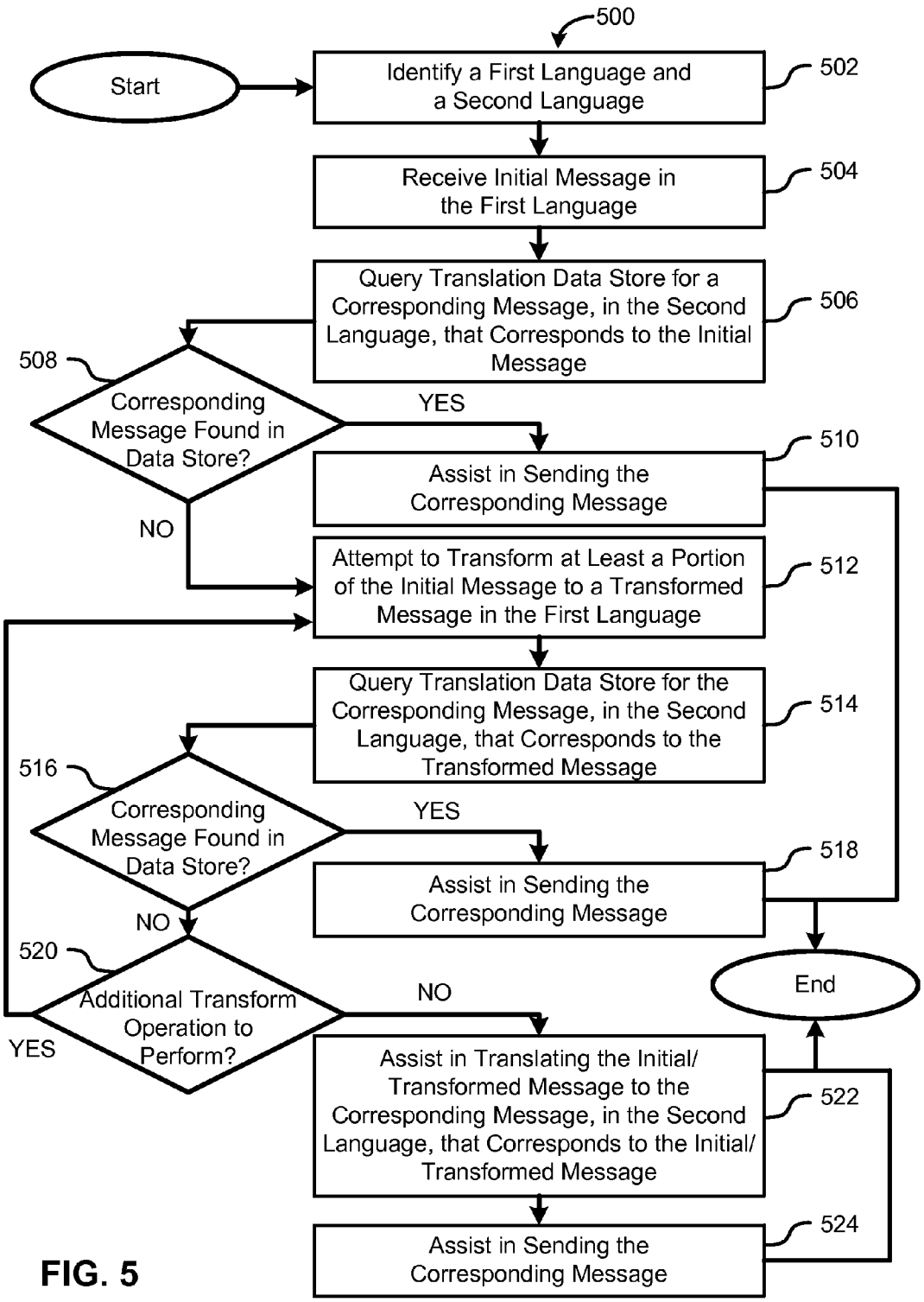
FIG. 5 is a flowchart illustrating an exemplary method of multi-lingual communication in accordance with various embodiments.

FIG. 5 is a flowchart illustrating an exemplary method 500 for multi-lingual communication in accordance with various embodiments. As described below, for some embodiments, the method illustrated by the method 500 may perform operations in connection with the chat client system 104-1, the chat client system 104-2, the CTT system 114 (e.g., of the chat server 108), and the translation module 116 (e.g., of translation server 110).

The method 500 may start at operation 502, the language module 204 (of the CTT system 114) may being by identifying a first language being used by a user at a first chat client system (e.g., 104-1) and a second language being used by a user at a second chat client system (e.g., 104-2). According to some embodiments, the language module 204 may identify the first language and the second language by obtaining language preferences/settings from the respective chat client system 104.

At operation 504, the CTT communications module 204 (of the CTT system 114) may receive an initial message in the first language. In some embodiments, the CTT communications module 204 may receive the initial message from the chat host system 112, which may have received the initial message from a chat client system (e.g., 104-1).

At operation 506, the CTT control module 202 (of the CTT system 114) may query the translation data store 210 for a corresponding message in the second language that corresponds to the initial message. At operation 508, the CTT control module 202 may determine if a corresponding message is found in the translation data store 210. If one exists, at operation 510, the CTT communications module 204 may assist in sending the corresponding message to the second chat client system (e.g., the chat client system 104-2). In some embodiments, the corresponding message may be sent to the chat host system 112, which may relay the corresponding message to the second chat client system (e.g., 104-2). The method 500 may then end.

If a corresponding message does not exist in the translation data store 210, at operation 512, the transformation module 208 may attempt to transform at least a portion of the initial message to a transformed message in the first language. As described herein, the message that results from the transformation module 208 may be transformed or may remain unchanged (e.g., when transformation operations of the transformation module 208 are not applied to the initial message). For some embodiments, the transformation module 208 may perform two or more transformation operations on the initial message in parallel, and in response, each of the two or more transformation operations may return a separate response, from which the transformation module 208 may then select one transformed message for further processing (e.g., to be used in operation 514). Depending on the embodiment, each response may comprise a flagged text portion, a suggested replacement, or a word or phrase inserted into the initial message. Thereafter, the transformed message selected may be according to a priority of selection, which can determine which transformed message is selected for further processing and according to what precedent. In some embodiments, the priority selection may be according to which transformation operation is most likely to generate a transformed message suitable for a subsequent lookup in the translation data store 210) or for subsequent machine translation. Additionally, in some embodiments, the priority of selection may be according to which transformation operation generates the most formal transformed message. The priority of selection may depend on the transformation/translation strategy selected by the embodiment.

At operation 514, assuming the transformation module 208 transformed the message, the CTT control module 202 (of the CTT system 114) may query the translation data store 210 for a corresponding message in the second language that corresponds to the transformed message. At operation 516, the CTT control module 202 may determine if a corresponding message is found in the translation data store 210. If one exists, at operation 518, the CTT communications module 204 may assist in sending the corresponding message to the second chat client system (e.g., the chat client system 104-2). In some embodiments, the corresponding message may be sent to the chat host system 112, which may then relay the corresponding message to the second chat client system (e.g., 104-2). The method 500 may then end.

For some embodiments, if a corresponding message still does not exist in the translation data store 210, at operation 520, the CTT control module 202 may determine if there are any additional transformation operations of the transformation module 208 to perform on the chat message that have not already been performed.

If an additional transformation operation exists, the method 500 returns to operation 512 and performs additional transformation operation(s). Depending on the embodiment, the additional transformation operation(s) may involve applying a transform operation different from those already performed on the initial message by the transformation module 208, may involve applying the same transformation operations performed but to different portions of the English chat message, or may involve some combination thereof. For example, if during the first execution of operation 512 the transformation module 208 applies a chatspeak-related operation to the initial message (to create a first transformed message), during a second execution of operation 512 the transformation module 208 may apply an abbreviation-related operation to the second transformed message. Following, a subsequent execution of operation 512, the method 500 may continue to operations 514 and 516, where the CTT control module 202 may re-query the translation data store 210 for a corresponding message in the second language that corresponds to the latest resulting transformed message, and the CTT control module 202 may determine if a corresponding message is found in the translation data store 210. By performing the transformation and query operations in this iterative manner, certain embodiments may be able to find a corresponding message before having to perform every transformation operation available. Those skilled in the art will appreciate that for certain embodiments, the transformation and query operations may be performed in series, with the query operation (e.g., operation 514) only being performed after every available transformation operation provided by the transformation module 208 has been performed on the chat message.

If a corresponding message does not exist in the translation data store 210 and an additional transformation operation (of the transformation module 208) does not exist, at operation 522, (through the translation API module 212) the translation module 116 may assist in the translating the initial message or the transformed message to a corresponding message in the second language. Subsequently, at operation 524, the CTT communications module 204 may assist in sending the corresponding message to the second chat client system (e.g., the chat client system 104-2). According to some embodiments, the corresponding message may be sent to the chat host system 112, which may then relay the corresponding message to the second chat client system (e.g., 104-2). The method 500 may then end.

For certain embodiments, the transformation module 208 may be utilized to transform the corresponding message in the second language before the corresponding message is sent to the chat host system 112. As described herein, the corresponding message may be submitted for further transformation processing to further refine the translation for the user at the second chat client system (e.g., 104-2). For example, if the initial message contains chatspeak in the first language (e.g., English), additional transformation processing can add, to the extent possible, chatspeak in the second language.

Though the steps of the above method may be depicted and described in a certain order, those skilled in the art will appreciate that the order in which the steps are performed may vary between embodiments. Additionally, those skilled in the art will appreciate that the components described above with respect to the method 500 are merely examples of components that may be used with the method, and for some embodiments other components may also be utilized in some embodiments.

Figure 6:
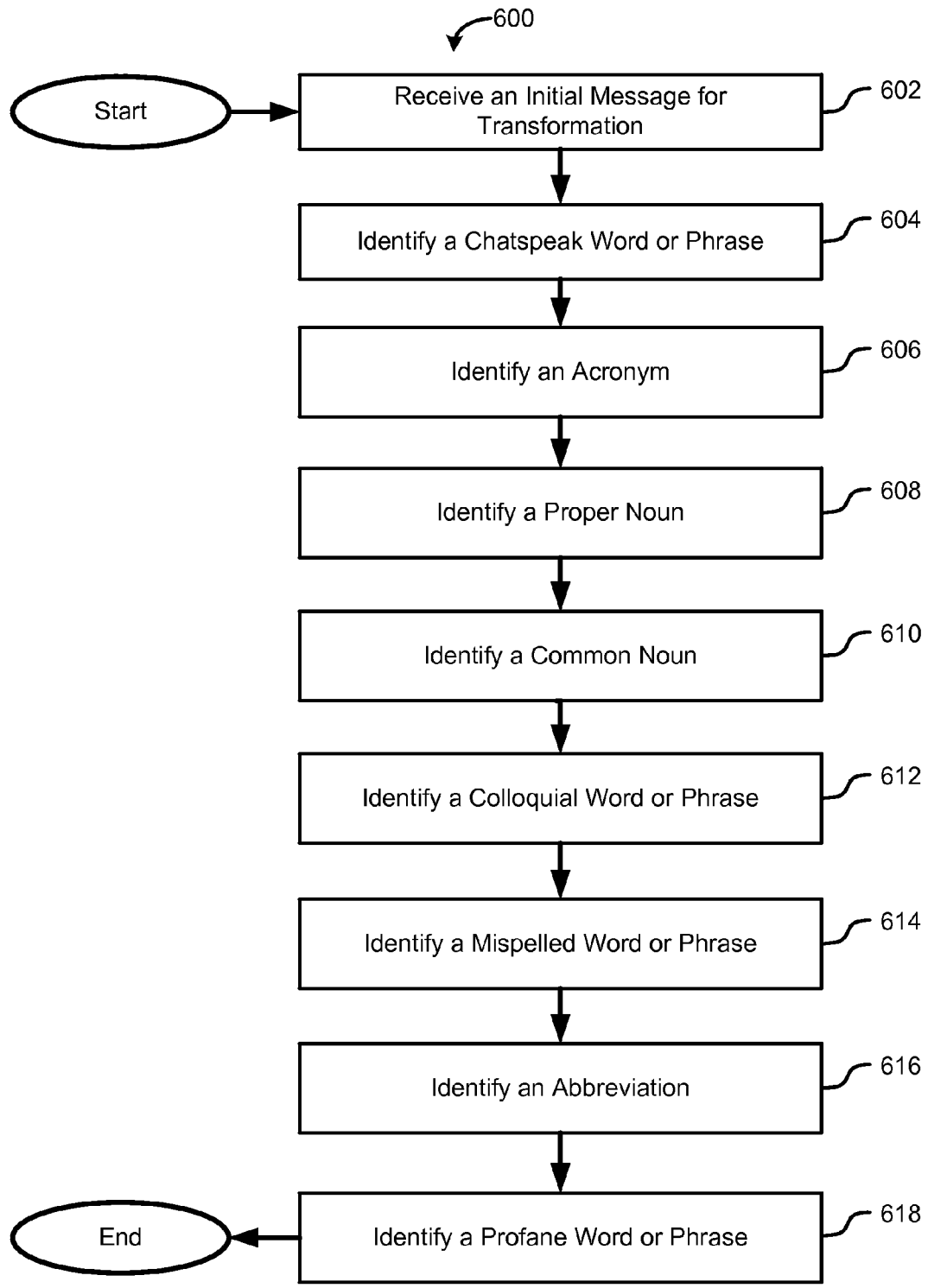
FIG. 6 is a flowchart illustrating an exemplary method of transforming communications in accordance with various embodiments.

FIG. 6 is a flowchart illustrating an exemplary method 600 for transforming communications in accordance with various embodiments. As described below, for some embodiments, the method 600 may perform operations in connection the transformation module 208 (e.g., of the CTT system 114).

The method may start at operation 602, with an initial message being received by the transformation module 208 for transformation processing. Based on some embodiments, the transformation module 208 may receive the initial message for transformation subsequent to a failure to identify a message in the translation data store 210, and possibly before the initial message is machine translated by a third-party or proprietary translation process (e.g., the translation module 116, which may be offered as a cloud-based service). As described herein, the transformation module 208 may be used in various embodiments to facilitate or otherwise improve text translation, particularly where the text comprises a minimal context, brief sentence construction, specialized/domain-related jargon (e.g., chatspeak for Internet-based chat) abbreviations, acronyms, colloquialisms, proper nouns, common nouns, profanity, or some combination thereof. Text translations that may benefit from the operations of the transformation module 208 may include, without limitation, translations of texts originating from conversations (e.g., transcript), from offline or online Internet-based chat (e.g., instant messaging), and from mobile phone messaging (e.g., SMS or MMS).

At operation 604, the chatspeak module 302 may identify one or more words or phrases in the initial message that are associated with chat jargon (i.e., chatspeak), and may further suggest replacement (e.g., corresponding formal/i.e., non-chatspeak) words or phrases for the identified words or phrases. In some embodiments, the chatspeak module 302 may flag an identified chatspeak word or phrase to be skipped or otherwise ignored during a subsequent machine translation (e.g., by the translation module 116). Additionally, in some embodiments, an identified chatspeak word or phrase may be flagged for later review and disposition by a human operator (e.g., an administrator of the CTT system 114). In order to identify a chatspeak word or phrase and/or its corresponding (formal) word or phrase, some embodiments may utilize a dataset (e.g., stored on a data store) comprising chatspeak words or phrases and/or mappings between chatspeak words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 604 (hereafter, "the first intermediate message") may comprise a chatspeak word or phrase flagged by the chatspeak module 302 to be ignored, a suggested replacement, or a non-chatspeak word or phrase inserted into the initial message by the chatspeak module 302 (e.g., in place of the identified chatspeak word or phrase). In some instances, the first intermediate message may be the same as the initial message (e.g., when no replacement is performed by the chatspeak module 302). Depending on the embodiment, the first intermediate message that results from the chatspeak module 302 may be provided to another transformation module (in the transformation module 208) for further processing or the suggested replacement may be provided to the CTT control module 202 to determine if the message transformed by the chatspeak module 302 is in the data store 210. Following operation 604, the first intermediate message may be provided to the next operation (e.g., operation 606) of the transformation module 208 for processing.

At operation 606, the acronym module 304 may identify one or more acronyms in a chat message, and may further suggest replacement words or phrases corresponding to (e.g., represented by) the acronyms. In some embodiments, the acronym module 304 may flag an identified acronym to be skipped or otherwise ignored during a subsequent machine translation (e.g., by the translation module 116). Additionally, in some embodiments, an identified acronym may be flagged for later review and disposition by a human operator (e.g., an administrator of the CTT system 114). In order to identify an acronym and/or its corresponding word or phrase, some embodiments may utilize a dataset (e.g., stored on a data store) comprising acronyms and/or mappings between acronyms and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 606 (hereafter, "the second intermediate message") may comprise an acronym flagged by the acronym module 304 to be ignored, a suggested replacement, or a word or phrase inserted into the message by the acronym module 304 (e.g., in place of the identified acronym). In some instances, the second intermediate message may be the same as the first intermediate message (e.g., when no replacement is performed by the acronym module 304). Depending on the embodiment, the second intermediate message that results from the acronym module 304 may be provided to another transformation module (in the transformation module 208) for further processing or the suggested replacement may be provided to the CTT control module 202 to determine if the message transformed by the acronym module 304 is in the data store 210. Following operation 606, the second intermediate message may be provided to the next operation (e.g., operation 608) of the transformation module 208 for processing.

At operation 608, the proper noun module 306 may identify one or more proper nouns in a chat message, and may further suggest replacement words or phrases corresponding to (e.g., represented by) the proper nouns. In some embodiments, the proper noun module 306 may flag an identified proper noun to be skipped or otherwise ignored during a subsequent machine translation (e.g., by the translation module 116). Additionally, in some embodiments, an identified proper noun may be flagged for later review and disposition by a human operator (e.g., an administrator of the CTT system 114). In order to identify a proper noun and/or its corresponding word or phrase, some embodiments may utilize a dataset (e.g., stored on a data store) comprising proper nouns (e.g., well-known proper nouns such as Disneyland®, or common names for individuals) and/or mappings between proper nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 608 (hereafter, "the third intermediate message") may comprise a proper noun flagged by the proper noun module 306 to be ignored, a suggested replacement, or a word or phrase inserted into the message by the proper noun module 306 (e.g., in place of the identified proper noun). In some instances, the third intermediate message may be the same as the second intermediate message (e.g., when no replacement is performed by the proper noun module 306). Depending on the embodiment, the third intermediate message that results from the proper noun module 306 may be provided to another transformation module (in the transformation module 208) for further processing or the suggested replacement may be provided to the CTT control module 202 to determine if the message transformed by the proper noun module 306 is in the data store 210. Following operation 608, the third intermediate message may be provided to the next operation (e.g., operation 610) of the transformation module 208 for processing.

At operation 610, the common noun module 308 may identify one or more common nouns in a chat message, and may further suggest replacement words or phrases corresponding to (e.g., represented by) the common nouns. In some embodiments, the common noun module 308 may flag an identified common noun to be skipped or otherwise ignored during a subsequent machine translation (e.g., by the translation module 116). Additionally, in some embodiments, an identified common noun may be flagged for later review and disposition by a human operator (e.g., an administrator of the CTT system 114). In order to identify a common noun and/or its corresponding word or phrase, some embodiments may utilize a dataset (e.g., stored on a data store) comprising common nouns and/or mappings between common nouns and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 610 (hereafter, "the fourth intermediate message") may comprise a common noun flagged by the common noun module 308 to be ignored, a suggested replacement, or a word or phrase inserted into the message by the common noun module 308 (e.g., in place of the identified common noun). In some instances, the fourth intermediate message may be the same as the third intermediate message (e.g., when no replacement is performed by the common noun module 308). Depending on the embodiment, the fourth intermediate message that results from the common noun module 308 may be provided to another transformation module (in the transformation module 208) for further processing or the suggested replacement may be provided to the CTT control module 202 to determine if the message transformed by the common noun module 308 is in the data store 210. Following operation 610, the fourth intermediate message may be provided to the next operation (e.g., operation 612) of the transformation module 208 for processing.

At operation 612, the colloquialism module 310 may identify one or more colloquial words or phrases in a chat message, and may further suggest replacement (e.g., corresponding formal/i.e., non-colloquial) words or phrases for the identified words or phrases. In some embodiments, the colloquialism module 310 may flag an identified colloquial word or phrase to be skipped or otherwise ignored during a subsequent machine translation (e.g., by the translation module 116). Additionally, in some embodiments, an identified colloquial word or phrase may be flagged for later review and disposition by a human operator (e.g., an administrator of the CTT system 114). In order to identify a colloquial word or phrase and/or its corresponding (formal) word or phrase, some embodiments may utilize a dataset (e.g., stored on a data store) comprising colloquial words or phrases and/or mappings between colloquial words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 612 (hereafter, "the fifth intermediate message") may comprise a colloquial word or phrase flagged by the colloquialism module 310 to be ignored, a suggested replacement, or a non-colloquial word or phrase inserted into the message by the colloquialism module 310 (e.g., in place of the identified colloquial word or phrase). In some instances, the fifth intermediate message may be the same as the fourth intermediate message (e.g., when no replacement is performed by the colloquialism noun module 310). Depending on the embodiment, the fifth intermediate message that results from the colloquialism module 310 may be provided to another transformation module (in the transformation module 208) for further processing or the suggested replacement may be provided to the CTT control module 202 to determine if the message transformed by the colloquialism module 310 is in the data store 210. Following operation 612, the fifth intermediate message may be provided to the next operation (e.g., operation 614) of the transformation module 208 for processing.

At operation 614, the spelling check module 312 may identify one or more misspelled words or phrases in a chat message, and may further suggest replacement (e.g. corrected) words or phrases for the identified words or phrases. For example, the spelling check module 312 may automatically correct the words or phrases with the suggested replacement words or phrases. In some embodiments, the spelling check module 312 may flag an identified misspelled word or phrase to be skipped or otherwise ignored during a subsequent machine translation (e.g., by the translation module 116). Additionally, in some embodiments, an identified misspelled word or phrase may be flagged for later review and disposition by a human operator (e.g., an administrator of the CTT system 114). In order to identify a misspelled word or phrase and/or its corresponding (corrected) word or phrase, some embodiments may utilize a dataset (e.g., stored on a data store) comprising misspelled words or phrases and/or mappings between misspelled words or phrases and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 614 (hereafter, "the sixth intermediate message") may comprise a misspelled word or phrase flagged by the spelling check module 312 to be ignored, a suggested replacement, or a corrected word or phrase inserted into the message by the spelling check module 312 (e.g., in place of the misspelled word or phrase). In some instances, the sixth intermediate message may be the same as the fifth intermediate message (e.g., when no replacement is performed by the spelling check module 312). Depending on the embodiment, the sixth intermediate message that results from the spelling check module 312 may be provided to another transformation module (in the transformation module 208) for further processing or the suggested replacement may be provided to the CTT control module 202 to determine if the message transformed by the spelling check module 312 is in the data store 210. Following operation 614, the sixth intermediate message may be provided to the next operation (e.g., operation 616) of the transformation module 208 for processing.

At operation 616, the abbreviation module 314 may identify one or more abbreviations in a chat message, and may further suggest replacement words or phrases corresponding to (e.g., represented by) the abbreviations. In some embodiments, the abbreviation module 314 may flag an identified abbreviation to be skipped or otherwise ignored during a subsequent machine translation (e.g., by the translation module 116). Additionally, in some embodiments, an identified abbreviation may be flagged for later review and disposition by a human operator (e.g., an administrator of the CTT system 114). In order to identify an abbreviation and/or its corresponding word or phrase, some embodiments may utilize a dataset (e.g., stored on a data store) comprising abbreviations and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 616 (hereafter, "the seventh intermediate message") may comprise an abbreviation flagged by the abbreviation module 314 to be ignored, a suggested replacement, or a word or phrase inserted into the message by the abbreviation module 314 (e.g., in place of the identified abbreviation). In some instances, the seventh intermediate message may be the same as the sixth intermediate message (e.g., when no replacement is performed by the abbreviation module 314). Depending on the embodiment, the seventh intermediate message that results from the abbreviation module 314 may be provided to another transformation module (in the transformation module 208) for further processing or the suggested replacement may be provided to the CTT control module 202 to determine if the message transformed by the abbreviation module 314 is in the data store 210. Following operation 616, the seventh intermediate message may be provided to the next operation (e.g., operation 618) of the transformation module 208 for processing.

At operation 618, the profanity module 316 may identify one or more profane words or phrases (hereafter, referred to as a "profanity") in a chat message, and may further suggest replacement words or phrases (e.g., suitable substitute) corresponding to the profanity (e.g., a toned down euphemism). In some embodiments, the profanity module 316 may flag identified profanity to be skipped or otherwise ignored during a subsequent machine translation (e.g., by the translation module 116). Additionally, in some embodiments, identified profanity may be flagged for later review and disposition by a human operator (e.g., an administrator of the CTT system 114). In order to identify profanity and/or its corresponding word or phrase, some embodiments may utilize a dataset (e.g., stored on a data store) comprising profanity and/or mappings between abbreviations and their corresponding words and phrases. The dataset may be constructed by way of training or a learning system, may be proprietary (e.g., manually collected "in-house" by an administrator of the CTT system 114), may be commercially acquired, or may be derived from a publicly available Internet knowledgebase. The message resulting from operation 618 (hereafter, "the eighth intermediate message") may comprise profanity flagged by the profanity module 316 to be ignored, a suggested replacement, or a word or phrase inserted into the message by the profanity module 316 (e.g., in place of the identified profanity). In some instances, the eighth intermediate message may be the same as the seventh intermediate message (e.g., when no replacement is performed by the profanity module 316). Depending on the embodiment, the eighth intermediate message that results from the profanity module 316 may be provided to another transformation module (in the transformation module 208) for further processing or the suggested replacement may be provided to the CTT control module 202 to determine if the message transformed by the profanity module 316 is in the data store 210. Following operation 618, the eighth intermediate message may be provided to the next operation of the transformation module 208 for processing. The method 600 may then end.

In accordance with some embodiments, the message that ultimately results from the transformation module 208 (e.g., the eighth intermediate message resulting from operation 618) may subsequently be used to query the translation data store 210 for a corresponding message, which can serve as a translation for the resulting message. Those skilled in the art will appreciate that in some instances, the message resulting from the transformation module 208 (e.g., message subsequently used in the query to the translation data store 210) may be the same as the initial message received (e.g., at operation 602) when no transformation has been applied to the initial message (e.g., the initial message passes through operations 604-618 without any transformations being applied).

Those skilled in the art will also appreciate that various embodiments may perform more or less operations than the ones shown, may perform operations different from those shown, and may perform operations in a different order. Generally, the types of transformation operations performed, and the order in which they are performed, may be depend on transformation strategy employed by the embodiments. As noted herein, various embodiments may implement different transformation/translation strategies in achieving their respective translations, with certain strategies being well suited for particular translation applications or translation contexts. The transformation/translation strategy employed may determine which transformation operations are performed, when the transformation operations are performed, or in what order the transformation operations are performed. The transformation/translation strategy may also determine what translations are populated into a translation data stores, and when a translation data store is utilized in the overall transformation/translation process.

For some embodiments, the intermediate messages resulting from operations in the method 600 may have an impact and/or cascading effect on messages that result from subsequent operations in the method 600. Additionally, for some embodiments, when a chat message is processed by the method 600, each operations of flow chart 600 may be performed on the chat message before the method concludes. Alternatively, for some embodiments, the method of flowchart 600 may terminate early upon the performance of only a subset of the operations shown (e.g., after at least one operation results in a transformation of the chat message). According to some embodiments, the performance of each operation in flowchart 500 may be followed by a query to the translation data store 210 for a corresponding message in the desired language based on the latest resulting transformed message; in the event a corresponding message is identified, the method of flowchart 500 may terminate early.

For various embodiments, the method 600 may perform operations 604-612 in parallel. For example, the CTT control module 202 may submit the initial message to two or more operations 604-612 in parallel, and receive from each of those two or more operations a separate response. Each response may comprise a flagged text portion, a suggested replacement, or a word or phrase inserted into the initial message. Thereafter, the CTT control module 202 may select one of the received responses for subsequent processing (e.g., query a translation data store 210 or translating by the translation module 116), possibly according to a priority of selection (e.g., which can determine which transformed message is selected for further processing and according to what precedent).

For instance, during the method 600, the CTT control module 202 may submit an initial message to operation 604 for identifying chatspeak processing, operation 610 for common noun processing, and operation 616 for abbreviation processing. In response, operation 604 may return the initial message transformed for chatspeak, operation 610 may return the initial message unchanged, and operation 616 may return the initial message transformed for abbreviations. Subsequently, based on a priority of selection, the CTT control module 202 may select the transformed message returned from operation 616 for further processing.

For certain embodiments, a time limit may be enforced on performing various operations in the method 600. The time limit may cause a transformation operation of method 600 to stop performing if a response/result is not received before the time limit has expired. In doing so, various embodiments may ensure that certain transformation operations do not unnecessarily hinder the overall transformation/translation process.

Though the operations of the above method may be depicted and described in a certain order, those skilled in the art will appreciate that the order in which the operations are performed may vary between embodiments. Additionally, those skilled in the art will appreciate that the components described above with respect to the method of the flowchart 600 are merely examples of components that may be used with the method, and for some embodiments other components may also be utilized in some embodiments.

Figure 7:
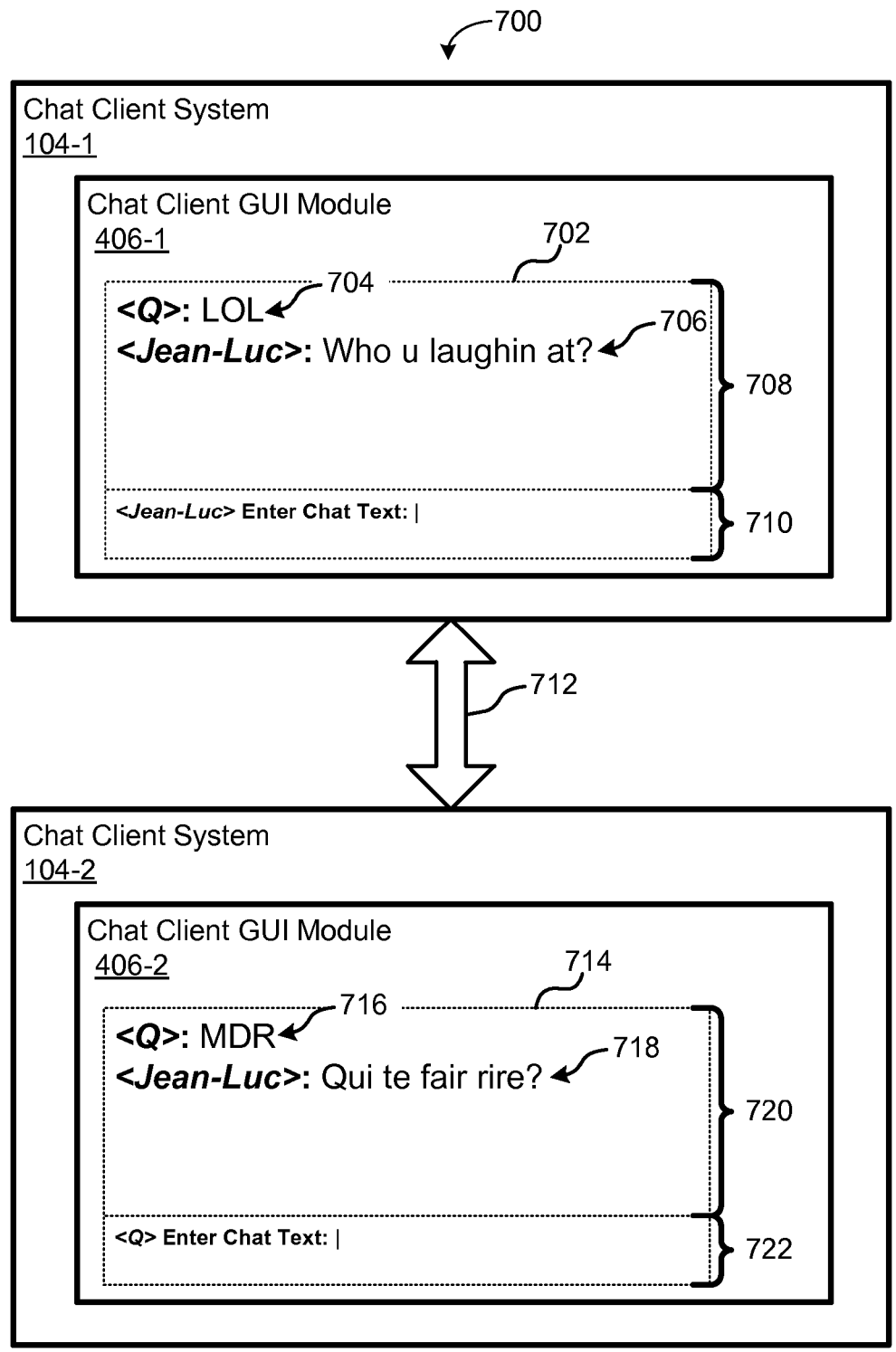
FIG. 7 is a diagram illustrating an exemplary multi-lingual chat session between chat client systems, in accordance with various embodiments.

FIG. 7 is a diagram 700 illustrating an exemplary multilingual chat session, between chat client systems 104 (e.g., 104-1 and 104-2), in accordance with various embodiments. As shown, the chat client system 104-1 may comprise a chat client GUI module 406-1, and the chat client system 104-2 may comprise a chat client GUI module 406-2. As described herein, each of the chat client GUI modules 406-1 and 406-2 may be configured to respectively provide users at chat client systems 104-1 and 104-2 with graphical input/output access to chat session shared between them. For some embodiments the chat client GUI modules 406-1 and 406-2 may present their respective user with a client GUI adapted for receiving user interactions with respect to the chat dialogue sent and received.

As chat dialogue 712 (represented by two-way arrow in FIG. 7) is passed between the chat client systems 104-1 and 104-2, the chat client GUI modules 406-1 and 406-2 may present the chat dialogue 712 in the language (implicitly or explicitly) chosen by the user at their respective chat client system 104-1 or 104-2. As shown, the chat client GUI module 406-1 may comprise a chat dialogue box 702 configured to present the chat dialogue 712 in a first language (e.g., English) in an output area 708 and to receive chat input in the first language in a second area 710. The chat client GUI module 406-2 may comprise a chat dialogue box 714 configured to present the chat dialogue 712 in a second language (e.g., French) in an output area 720 and to receive chat input in the second language in a second area 722. For some embodiments, when the chat dialogue 712 is presented in the dialogue boxes 702 and 714, it may include the presentation of usernames (e.g., user online identifier) associated with the users entering the chat messages in the chat dialogue 712.

In the illustrated embodiment of FIG. 7, the language chosen for the chat client system 104-1 is English and the language chosen for the chat client system 104-2 is French. Accordingly, chat messages 704 ("LOL") and 706 ("Who u laughin at?") are presented in English in the dialogue box 702 of the chat client GUI module 406-1, while their respective counterpart chat messages 716 ("MDR") and 718 ("Qui to fair rice?") are presented in French in the dialogue box 714 of the chat client GUI module 406-2. The translation of the chat messages 704, 706, 716, and 718 may be facilitated through various systems and methods described herein. More regarding the translation of messages similar to chat messages 704, 706, 716, and 718 are discussed with respect to FIG. 8-10.

Figure 8:
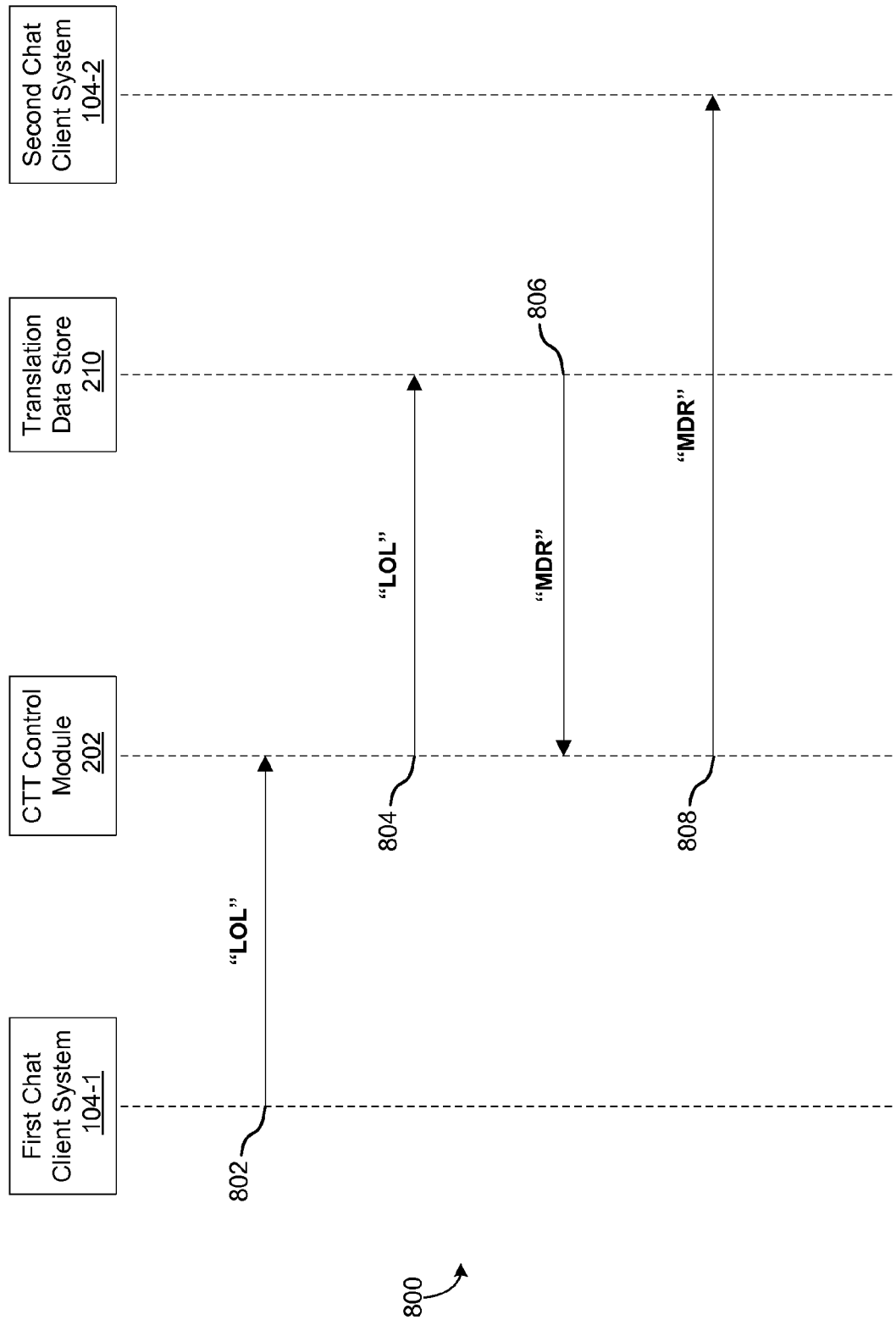
FIG. 8 is a flowchart illustrating operation of an exemplary multi-lingual communication method in accordance with various embodiments.

FIG. 8 is a flowchart illustrating operation of an exemplary multi-lingual communication method 800 in accordance with various embodiments. As described below, for some embodiments, the method 800 may perform operations in connection with the chat client system 104-1, the chat client system 104-2, and the CTT system 114 (e.g., of the chart server 108). In particular, FIG. 8 illustrates the translation of an English chat message comprising the text "LOL" to a French chat message in accordance with some embodiments. Such a situation may arise when the language being used by the user at the first chat client system 104-1 is English and the language being used by the user at the second chat client system 104-2 is French. According to some embodiments, and the CTT system 114 may automatically detect these language choices/preferences for the chat client systems 104-1 and 104-2.

As shown, at operation 802, the first chat client system 104-1 may submit the English message for transmission to the second chat client system 104-2 (e.g., via the chat host system 112). The English message may be routed to the CTT control module 202 of the CTT system 114 for translation processing.

At operation 804, the CTT control module 202 may query the translation data store 210 for a chat message that corresponds to the English chat message ("LOL") and that is pre-translated to French. In response, at operation 806, the translation data store 210 may return to the CTT control module 202 a corresponding French message ("MDR") that corresponds to the English chat message ("LOL"). Subsequently, at operation 808, the CTT control module 202 may assist in the transmission of the corresponding French chat message ("MDR") to the second chat client system 104-2 (e.g., CTT system 114 submits the corresponding French chat message to the chat host system 112 for transmission).

Figure 9:
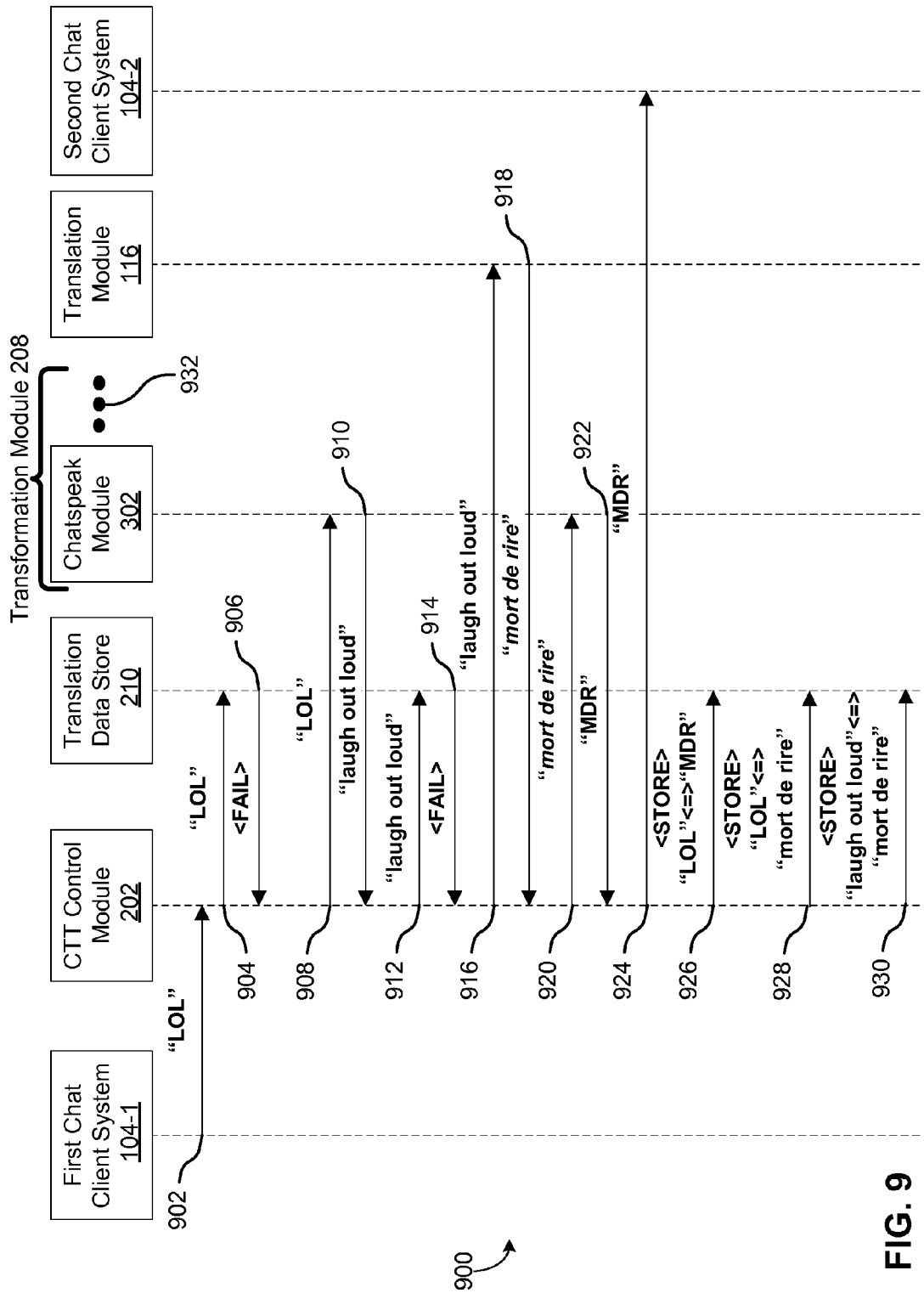
FIG. 9 is a flowchart illustrating operation of an exemplary multi-lingual communication method in accordance with various embodiments.

FIG. 9 is a flowchart illustrating operation of an exemplary multi-lingual communication method 900 in accordance with various embodiments. As described below, for some embodiments, the method illustrated by the flowchart 900 may perform operations in connection with the chat client system 104-1, the chat client system 104-2, the CTT system 114 (e.g., of the chart server 108), and the translation module 116 (e.g., of translation server 110). In particular, FIG. 9 illustrates the translation of an English chat message comprising the text "LOL" to a French equivalent chat message, in accordance with some embodiments. Unlike the illustrated embodiment of FIG. 8, FIG. 9 illustrates the usage of the transformation module 208 (e.g., of the CTT system 114) and the translation module 116.

As shown, at operation 902, the first chat client system 104-1 may submit the English chat message for transmission to the second chat client system 104-2 (e.g., via the chat host system 112) with a user that speaks French. The English chat message may be routed to the CTT control module 202 of the CTT system 114 for translation processing.

At operation 904, the CTT control module 202 may query the translation data store 210 for a French equivalent chat message that corresponds to the English chat message ("LOL). In response, at operation 906, the translation data store 210 may return a query failure to the CTT control module 202 to indicate that the translation data store 210 does not have a corresponding French chat message for the English chat message ("LOL"). If such is the case, at operation 908, the CTT control module 202 may submit the English chat message to the transformation module 208 for transformation processing in accordance with certain embodiments. As described herein, the transformation module 208 may comprise multiple transformation-related modules 932 configured to transform a chat message to a message more suitable for further translation processing.

At operation 910, the chatspeak module 302 of the transformation module 208 may transform the English chat message ("LOL") to the transformed English chat message ("laugh out loud"), and may return the transformed English chat message to the CTT control module 202 for further processing. Those skilled in the art will appreciate that, for some embodiments, the English chat message may be processed by additional modules of the transformation module 208 before the transformed English chat message is returned to the CTT control module 202.

At operation 912, the CTT control module 202 may query the translation data store 210 for a French equivalent chat message that corresponds to the transformed English chat message ("laugh out loud"). In response, at operation 914, the translation data store 210 may return a query failure to the CTT control module 202 to indicate that the translation data store 210 does not have a corresponding French chat message for the transformed English chat message ("laugh out loud"). If such is the case, at operation 916, the CTT control module 202 may submit the transformed English chat message to the translation module 116 for machine translation processing in accordance with certain embodiments.

At operation 918, the translation module 116 may return a machine-translated French chat message ("mort de rice") that corresponds to the transformed English chat message. The resulting machine-translated French chat message ("mort de rire") is an example of a transformed translation of an English chatspeak chat message ("LOL").

At operation 920, the CTT control module 202 may submit the machine-translated French chat message ("mort de rire") to the transformation module 208 for further transformation processing of the machine-translated French chat message in accordance with certain embodiments. As noted herein, the machine-translated text may be submitted for further transformation processing to further refine the French translation. For example, if the original English chat message contained English chatspeak, the additional transformation processing can add, to the extent possible, French chatspeak. Accordingly, at operation 922, the chatspeak module 302 of the transformation module 208 may transform the machine-translated French chat message ("mort de rire") to the transformed French chat message ("MDR"), and may return the transformed French chat message to the CTT control module 202 for further processing.

Eventually, at operation 924, the CTT control module 202 may assist in the transmission of the corresponding French chat message ("MDR") to the second chat client system 104-2 (e.g., CTT system 114 submits the corresponding French chat message to the chat host system 112 for transmission). Additionally, at operation 926, the CTT control module 202 may store a translation mapping in the translation data store 210 of the transformed translation between the original English chat message ("LOL") and the translated French chat message ("MDR"). Once the mapping is stored in the translation data store 210, it may be used to store translation entries to speed up future translations, e.g., as illustrated in FIG. 8. As noted herein, the translation data store 210 may store mappings of transformed translations and untransformed translations.

For some embodiments, the CTT control module 202 may also store equivalent (transformed and untransformed) translation mappings determined during the operation of the method 900. For certain embodiments, the translation mappings may be between chat message that were not original located in the translation data store 210 (e.g., the chat message shown for operation 904, and the chat message shown for operation 912) and a corresponding message determined during operations subsequent to the translation data store 210 lookups (e.g., a mapping between a query to the translation data store 210 that returns no result and a corresponding chat message determined after the query, by way of the transformation module 208 and/or the translation module 116).

For instance, as shown in FIG. 9, the CTT control module 202 queries the translation data store 210 for original English chat message ("LOL") at operation 904 and the transformed English chat message ("laugh out loud") at operation 912, both of which resulted in the CTT control module 202 receiving no results from the translation data store 210 (at operations 906 and 914, respectively). However, at operation 916, the CTT control module 202 eventually submits the transformed English message ("laugh out loud") to the machine translation module 116 for machine translation and receives, in response the machine-translated French chat message ("mort de rire") at operation 918. Accordingly, at operation 928, the CTT control module 202 may store a translation mapping in the translation data store 210 of the transformed translation between the original English chat message ("LOL") and the machine-translated French chat message ("mort de rire"). Likewise, at operation 930, the CTT control module 202 may store a translation mapping in the translation data store 210 of the transformed translation between the transformed English chat message ("laugh out loud") and the machine-translated French chat message ("mort de rire"). In doing so, next time method 900 queries the translation data store 210 for the original English chat message ("LOL") or the transformed English chat message ("laugh out loud"), the translation data store 210 will provide the corresponding transformed translations.

Figure 10:
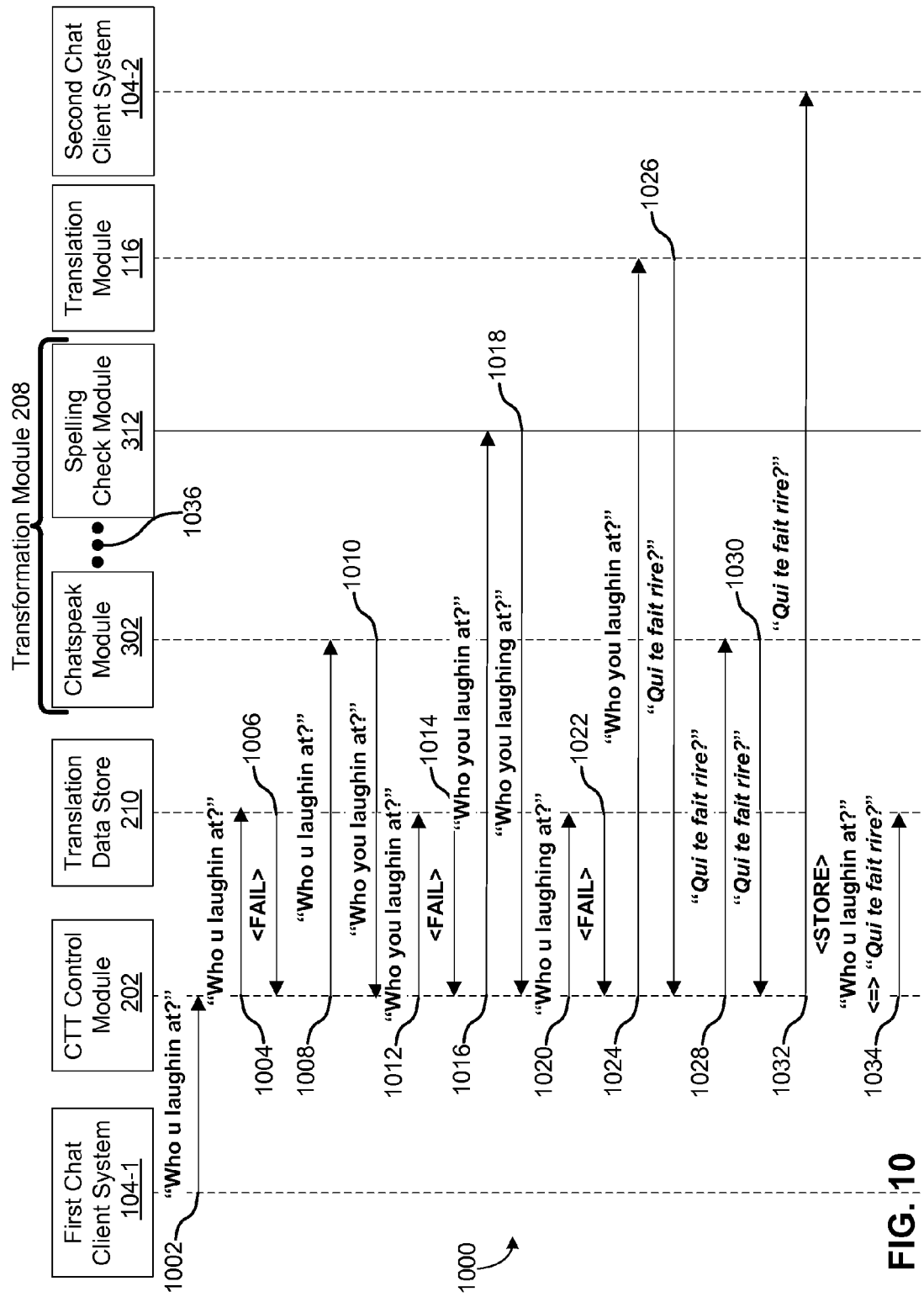
FIG. 10 is a flowchart illustrating operation of an exemplary multi-lingual communication method in accordance with various embodiments.

FIG. 10 is a flowchart illustrating operation of an exemplary multi-lingual communication method 1000 in accordance with various embodiments. As described below, for some embodiments, the method 1000 may perform operations in connection with the chat client system 104-1, the chat client system 104-2, the CTT system 114 (e.g., of the chart server 108), and the translation module 116 (e.g., of the translation server 110). In particular, FIG. 10 illustrates the translation of an English chat message comprising the text "Who u laughin at?" to a French chat message, in accordance with some embodiments.

As shown, at operation 1002, the first chat client system 104-1 may submit the English chat message for transmission to the second chat client system 104-2 (e.g., via the chat host system 112). The English chat message may be routed to the CTT control module 202 of the CTT system 114 for translation processing.

At operation 1004, the CTT control module 202 may query the translation data store 210 for a French equivalent chat message that corresponds to the English chat message ("Who u laughin at?"). In response, at operation 1006, the translation data store 210 may return a query failure to the CTT control module 202 to indicate that the translation data store 210 does not have a corresponding French chat message for the English chat message ("Who u laughin at?"). If such is the case, at operation 1008, the CTT control module 202 may submit the English chat message to the transformation module 208 for transformation processing in accordance with certain embodiments. As described herein, the transformation module 208 may comprise multiple transformation-related modules 1036 configured to transform a chat message to a message more suitable for further translation processing.

At operation 1010, the chatspeak module 302 of the transformation module 208 may transform the English chat message ("Who u laughin at?") to the transformed English chat message ("Who you laughin at?"), and pass on the transformed English chat message to additional modules of the transformation module 208 for further processing, such as the spelling check module 312.

As discussed herein, various modules of transformation module 208, including the chatspeak module 302, may be configured to identify one or more words or phrases in a chat message and suggest replacement words or phrases for the identified words or phrases. Accordingly, those skilled in the art would appreciate that for some embodiments, the transformation performed/suggested by a module of transformation module 208 may involve a word-to-phrase or a phrase-to-phrase transformation of the chat message. For example, at operation 1010, the chatspeak module 302 may alternatively transform the English chat message ("Who u laughin at?") to the transformed English chat message ("Who are you laughing at?"), possibly by replacing/suggesting the replacement of the phrase "who u" with "who are you" during the transformation (followed by the replacement/ suggestion of the replacing the word "laughin" with "laughing"). In doing so, various modules of the transformation module 208, such as the chatspeak module 302, may provide grammatical improvements to their respective transformations, while possibly obviating the need for a separate module in the transformation module 208 to implement grammar improvements.

For some embodiments, before the transformed English chat message is passed on to additional modules of the transformation module 208, the chatspeak module 302 may pass on the transformed English chat message to the CTT control module 202 at operation 1010. In turn, the CTT control module 202 may query the translation data store 210 (at operation 1012) for a French equivalent chat message that corresponds to the transformed English chat message ("Who you laughin at?"). In response, at operation 1014, the translation data store 210 may return a query failure to the CTT control module 202 to indicate that the translation data store 210 does not have a corresponding French chat message for the transformed English chat message ("Who you laughin at?").

At operation 1016, the spelling check module 312 may perform a spell check process on the transformed English chat message ("Who you laughin at?") at operation 1018. During the spell check process, the spelling check module 312 may correct the transformed English chat message to a corrected English chat message ("Who you laughing at?"), and may return the corrected English chat message to the CTT control module 202. Those skilled in the art will appreciate that for some embodiments, the corrected English chat message may processed by additional modules of the transformation module 208 before the transformed English chat message is returned to the CTT control module 202.

At operation 1020, the CTT control module 202 may query the translation data store 210 for a French equivalent chat message that corresponds to the corrected English chat message ("Who you laughing at?"). In response, at operation 1022, the translation data store 210 may return a query failure to the CTT control module 202 to indicate that the translation data store 210 does not have a corresponding French chat message for the corrected English chat message ("Who you laughing at?"). If such is the case, at operation 1024, the CTT control module 202 may submit the corrected English chat message to the translation module 116 for machine translation processing in accordance with certain embodiments.

At operation 1026, the translation module 116 may return a machine-translated French chat message ("Qui te fait rire?") that corresponds to the corrected English chat message. At operation 1028, the CTT control module 202 may submit the machine-translated French chat message ("Qui te fait rice?") to the transformation module 208 for further transformation processing of the machine-translated French chat message in accordance with certain embodiments.

As noted herein, the machine-translated text may be submitted for further transformation processing to further refine the translation of the text. For example, if the original English chat message contained English chatspeak, the additional transformation processing can add, to the extent possible, French chatspeak. At operation 1030, the transformation module 208 may return the machine-translated French chat message ("Qui te fait rire?") unchanged to the CTT control module 202 for further processing (e.g., when the modules of the transformation module 208 do not apply any changes to the machine-translated French chat message).

At operation 1032, the CTT control module 202 may assist in the transmission of the machine-translated French chat message ("Qui te fait rire?") to the second chat client system 104-2 (e.g., CTT system 114 submits the corresponding French chat message to the chat host system 112 for transmission). Additionally, at operation 1034, the CTT control module 202 may store a translation mapping in the translation data store 210 between the original English chat message ("Who u laughin at?") and the translated French chat message ("Qui te fait rire?"). As described herein, in additional operations (not shown), the CTT control module 202 may also store equivalent translation mappings in the translation data store 210 based on previously failed queries to the translation data store 210 and corresponding messages determined subsequent to those queries (e.g., similar to operations 928 and 930 in FIG. 9).

According to some embodiments, the transformation operations performed by the transformation module 208 may comprise performing certain transformation operations in parallel, and perform certain transformation operations in serial. The order in which transformation operations are performed in parallel and in serial may vary between various embodiments. As described herein, where the transformation operations are performed in parallel, some embodiments may employ a priority of selection to determine which transformed message is selected for further processing and according to what precedent.

Figure 11:
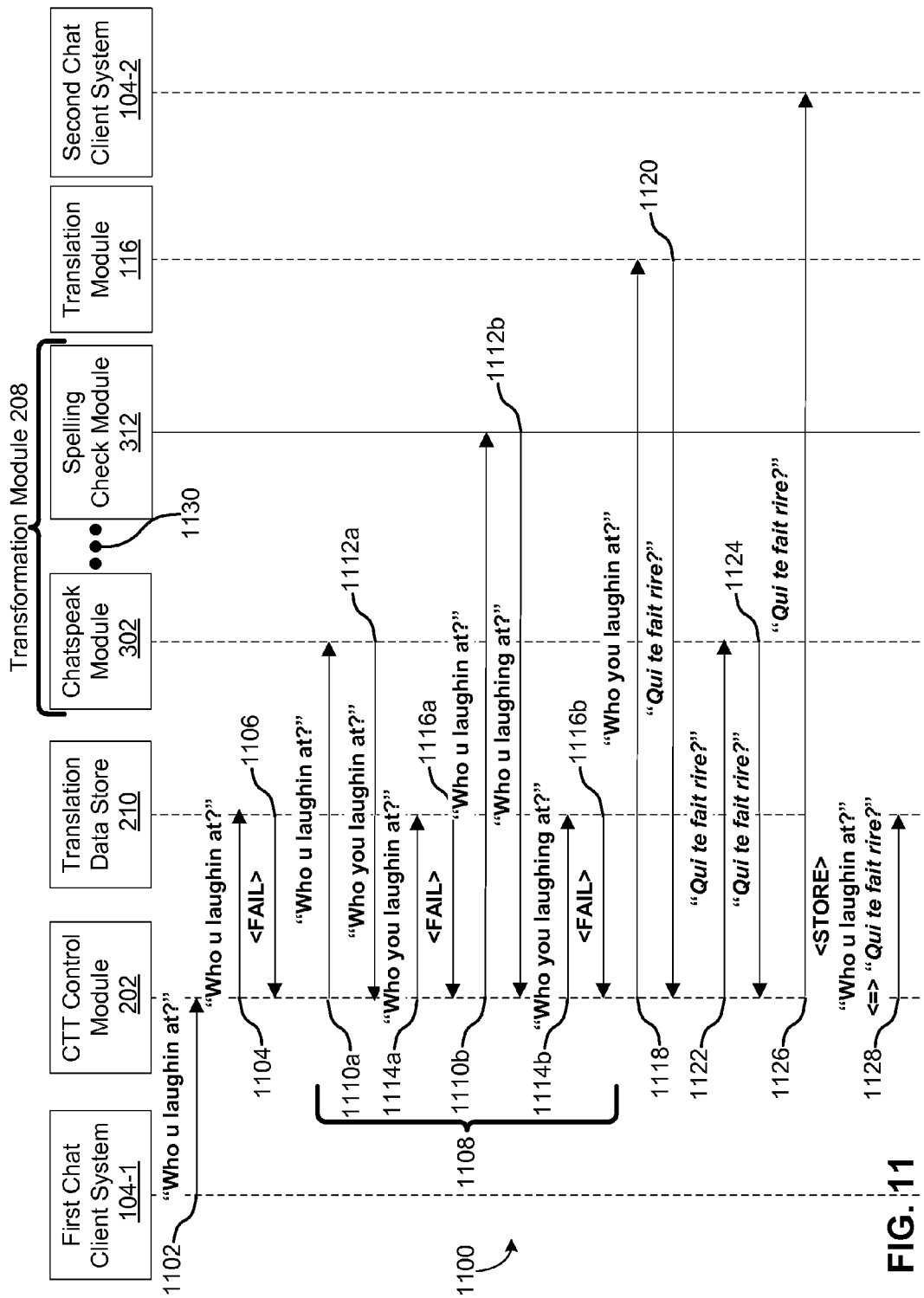
FIG. 11 is a flowchart illustrating operation of an exemplary multi-lingual communication method in accordance with various embodiments.

FIG. 11 is a flowchart illustrating operation of an exemplary multi-lingual communication method 1100 in accordance with various embodiments. As described below, for some embodiments, the method 1100 may perform operations in connection with the chat client system 104-1, the chat client system 104-2, the CTT system 114 (e.g., of the chart server 108), and the translation module 116 (e.g., of the translation server 110). In particular, FIG. 11 illustrates the translation of an English chat message comprising the text "Who u laughin at?" to a French chat message by parallel transformation operations, in accordance with some embodiments.

As shown, at operation 1102, the first chat client system 104-1 may submit the English chat message for transmission to the second chat client system 104-2 (e.g., via the chat host system 112). The English chat message may be routed to the CTT control module 202 of the CTT system 114 for translation processing.

At operation 1104, the CTT control module 202 may query the translation data store 210 for a French equivalent chat message that corresponds to the English chat message ("Who u laughin at?"). In response, at operation 1106, the translation data store 210 may return a query failure to the CTT control module 202 to indicate that the translation data store 210 does not have a corresponding French chat message for the English chat message ("Who u laughin at?").

If such is the case, the CTT control module 202 may submit the English chat message to the transformation module 208 for transformation processing in accordance with certain embodiments. As described herein, the transformation module 208 may comprise multiple transformation-related modules 1130 configured to transform a chat message to a message more suitable for further translation processing. As shown in FIG. 11, during operations 1108, the CTT control module 202 may submit the English chat message ("Who u laughin at?"), in parallel, to two or more transformation-related modules 1130 of the transformation module 208. Additionally, during operations 1108, the CTT control module 202 may be receiving results from the transformation-related modules 1130 in parallel, and submitting queries to the translation data store 210, based on the transformation results, in parallel.

Accordingly, at operation 1110a, the CTT control module 202 may submit the English chat message ("Who u laughin at?") to the chatspeak module 302 for transformation processing. In parallel, at operation 1110b, the CTT control module 202 may submit the English chat message ("Who u laughin at?") to the spelling check module 312 for transformation processing. Subsequently, the CTT control module 202 may receive a first transformed English chat message ("Who you laughin at?") from the chatspeak module 302 at operation 1112a, while at operation 1112b the CTT control module 202 may receive a second transformed English chat message ("Who u laughing at?") from the spelling check module 312. Depending on their respective transformation processing times, the chatspeak module 302, the spelling check module 312, and the other transformation-related modules 1130 may respond to the CTT control module 202 in serial or in parallel with respect to one another.

Subsequently, at operation 1114a, the CTT control module 202 may query the translation data store 210 for a French equivalent chat message that corresponds to the first transformed English chat message ("Who you laughin at?"). At operation 1114b, the CTT control module 202 may query the translation data store 210 for a French equivalent chat message that corresponds to the second transformed English chat message ("Who u laughing at?"). For some embodiments, during operations 1114a and 1114b, the CTT control module 202 may query the translation data store 210 in serial or in parallel. In some embodiments, the timings of the queries may depend on when the transformation-related modules 1130 of the transformation module 208 return their respective responses. As shown in FIG. 11, the translation data store 210 may return a query failure (e.g., <FAIL>) for the queries at operations 1116a and 1116b.

Eventually, the CTT control module 202 may select one transformed message, from the two or more messages that result from the parallel operations 1108, for further processing. Where only one of the transformation-related modules 1130 results in a transformed message, the CTT control module 202 may select that particular transformed message for further processing. As noted herein, the CTT control module 202 may select a transformed message based on a priority of selection, which may be determined according to the transformation/translation strategy selected by the embodiments. For some embodiments, the priority of selection may be based on whether the transformed message has the most formal content, the transformed message has the most transformations, or the transformed message results from a transformation-related module known for having a high likelihood of producing a transformed message suitable for machine-translation.

Once a transformed message has been selected, at operation 1118, the CTT control module 202 may submit the transformed English chat message to the translation module 116 for machine translation processing in accordance with certain embodiments. For example, as shown in FIG. 11, the CTT control module 202 may select the first transformed English chat message produced by the chatspeak module 302 ("Who you laughin at?") for submission to the translation module 116.

At operation 1120, the translation module 116 may return a machine-translated French chat message ("Qui te fait rire?") that corresponds to the first transformed English chat message (and despite comprising the misspelled word "laughin"). At operation 1122, the CTT control module 202 may submit the machine-translated French chat message ("Qui te fait rire?") to the transformation module 208 for further transformation processing of the machine-translated French chat message in accordance with certain embodiments.

As noted herein, the machine-translated text may be submitted for further transformation processing to further refine the translation of the text. For example, if the original English chat message contained English chatspeak, the additional transformation processing can add, to the extent possible, French chatspeak. At operation 1124, the transformation module 208 may return the machine-translated French chat message ("Qui te fait rire?") unchanged to the CTT control module 202 for further processing (e.g., when the modules of the transformation module 208 do not apply any changes to the machine-translated French chat message).

At operation 1126, the CTT control module 202 may assist in the transmission of the machine-translated French chat message ("Qui te fait rice?") to the second chat client system 104-2 (e.g., CTT system 114 submits the corresponding French chat message to the chat host system 112 for transmission). Additionally, at operation 1128, the CTT control module 202 may store a translation mapping in the translation data store 210 between the original English chat message ("Who u laughin at?") and the translated French chat message ("Qui te fait rire?"). As described herein, in additional operations (not shown), the CTT control module 202 may also store equivalent translation mappings in the translation data store 210 based on previously failed queries to the translation data store 210 and corresponding messages determined subsequent to those queries (e.g., similar to operations 928 and 930 in FIG. 9).

For some embodiments, the transformation operations may be performed in a hybrid serial/parallel arrangement, whereby some transformation operations are performed in parallel and other transformation operations are performed in serial. For example, as shown in FIG. 11, the English chat message ("Who u laughin at?") is submitted to the chat speak module 302 and spelling check module 312 in parallel at operations 1110a and 1110b. Subsequently, once one of the resulting transformed messages is selected (e.g., based on a priority of selection), the other transformation-related modules 1130 of the transformation module 208 (e.g., the acronym module 304, the proper noun module 306, and the common noun module 308) may operate on the selected transformed message in parallel.

Figure 12:
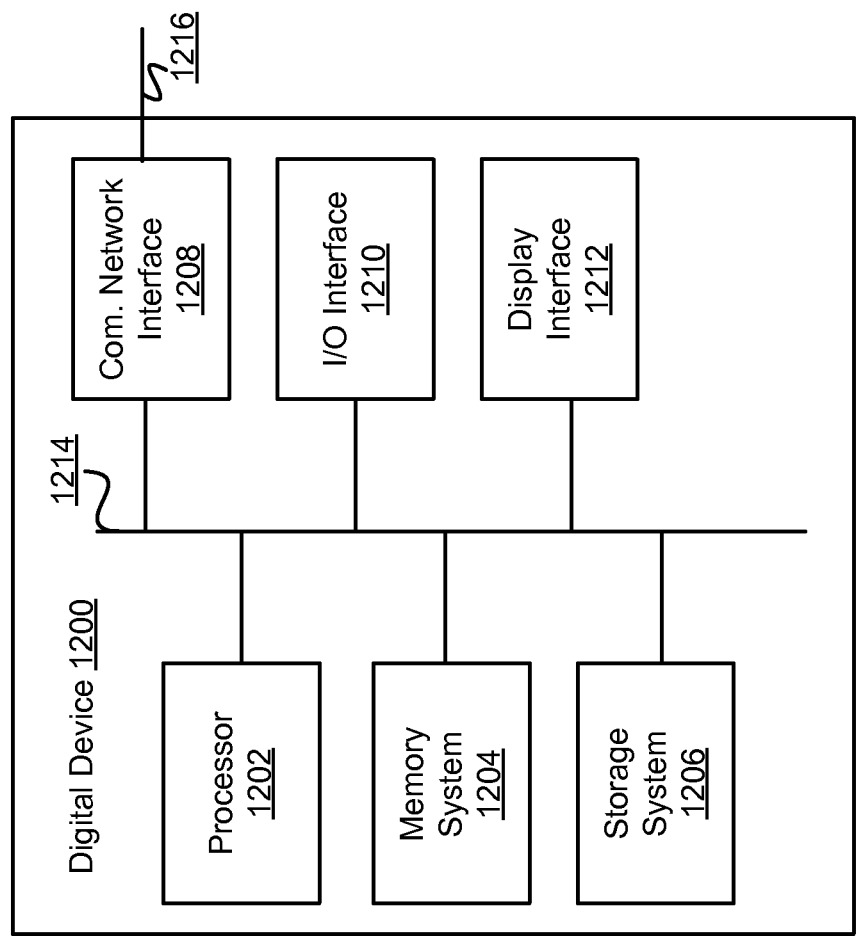
FIG. 12 is a block diagram illustrating an exemplary digital device that can be utilized in the implementation of various embodiments.

FIG. 12 is a block diagram of an exemplary digital device 1200. The digital device 1200 comprises a processor 1202, a memory system 1204, a storage system 1206, a communication network interface 1208, an I/O interface 1210, and a display interface 1212 communicatively coupled to a bus 1214. The processor 1202 is configured to execute executable instructions (e.g., programs). In some embodiments, the processor 1202 comprises circuitry or any processor capable of processing the executable instructions.

The memory system 1204 is any memory configured to store data. Some examples of the memory system 1204 are storage devices, such as RAM or ROM. The memory system 1204 can comprise the ram cache. In various embodiments, data is stored within the memory system 1204. The data within the memory system 1204 may be cleared or ultimately transferred to the storage system 1206.

The storage system 1206 is any storage configured to retrieve and store data. Some examples of the storage system 1206 are flash drives, hard drives, optical drives, and/or magnetic tape. In some embodiments, the digital device 1200 includes a memory system 1204 in the form of RAM and a storage system 1206 in the form of flash data. Both the memory system 1204 and the storage system 1206 comprise computer readable media which may store instructions or programs that are executable by a computer processor including the processor 1202.

The communications network interface (com. network interface) 1208 can be coupled to a network (e.g., the computer network 106) via the link 1216. The communication network interface 1208 may support communication over an Ethernet connection, a serial connection, a parallel connection, or an ATA connection, for example. The communication network interface 1208 may also support wireless communication (e.g., 802.11a/b/g/n, WiMax). It will be apparent to those skilled in the art that the communication network interface 1208 can support many wired and wireless standards.

The optional input/output (I/O) interface 1210 is any device that receives input from the user and output data. The optional display interface 1212 is any device that is configured to output graphics and data to a display. In one example, the display interface 1212 is a graphics adapter.

It will be appreciated by those skilled in the art that the hardware elements of the digital device 1200 are not limited to those depicted in FIG. 12. A digital device 1200 may comprise more or less hardware elements than those depicted. Further, hardware elements may share functionality and still be within various embodiments described herein. In one example, encoding and/or decoding may be performed by the processor 1202 and/or a co-processor located on a GPU (i.e., Nvidia®).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

What is claimed is:

1. A computer-implemented method comprising:
obtaining, using one or more computer processors, an initial message in a first language authored by a first person;
querying, using the one or more computer processors, a data store for a first corresponding message in a second language, the first corresponding message being a translation of the initial message;
determining, using the one or more computer processors, that the data store does not include the first corresponding message and, based thereon:
providing, using the one or more computer processors, the initial message to an initial transformation module in a sequence of transformation modules, each transformation module other than the initial transformation module being configured to accept, as input, an output of an immediately preceding transformation module in the sequence and provide, as output, a respective transformed message, and wherein a particular transformation module in the sequence is configured to flag at least a portion of the particular transformation module's output as not to be transformed by subsequent transformation modules in the sequence;
selecting, using the one or more computer processors, output of the final transformation module in the sequence as a transformed message in the first language; and
querying, using the one or more computer processors, the data store for a second corresponding message in the second language, the second corresponding message being a translation of the transformed message in the first language.

2. The method of claim 1, further comprising providing the initial message or the transformed message to a machine translation system to obtain a third corresponding message in the second language.

3. The method of claim 2, wherein the transformed message is translated to the third corresponding message in the second language if the data store does not include the second corresponding message.

4. The method of claim 2, wherein the initial message is translated to the third corresponding message in the second language if the transformation modules do not transform at least a portion of the initial message.

5. The method of claim 1, wherein one of the transformation modules performs the following:
identifying a chatspeak word or phrase in the initial message; and
replacing the chatspeak word or phrase with a non-chatspeak word or phrase.

6. The method of claim 1, wherein one of the transformation modules performs a spelling check on the initial message.

7. The method of claim 1, wherein one of the transformation modules performs the following:
identifying an abbreviation in the initial message; and
replacing the abbreviation with a word or a phrase corresponding to the abbreviation.

8. The method of claim 1, wherein one of the transformation modules performs the following:
identifying an acronym in the initial message; and
replacing the acronym with a word or a phrase corresponding to the acronym.

9. The method of claim 1, wherein one of the transformation modules performs the following:
identifying a colloquial word or phrase in the initial message; and
replacing the colloquial word or phrase with a word or a phrase representing the colloquial word or phrase.

10. The method of claim 1, wherein one of the transformation modules performs the following:
identifying a profane word or phrase in the initial message; and
replacing the profane word or phrase with a non-profane word or phrase or removing the profane word or phrase.

11. The method of claim 1, wherein the initial message comprises text.

12. The method of claim 1, wherein the initial message comprises an emoticon.

13. The method of claim 1, wherein the initial message is part of a larger message.

14. The method of claim 1, wherein the portion flagged comprises a proper noun, a common noun, a diminutive, an abbreviation, or an acronym.

15. The method of claim 1, wherein the data store comprises at least one of an untransformed translation and a transformed translation.

16. A system comprising:
one or more computer processors programmed to perform operations comprising:
identifying, using the one or more computer processors, the first language and the second language;
obtaining, using the one or more computer processors, an initial message in the first language from the first chat client system;
querying, using the one or more computer processors, the data store for a first corresponding message in the second language, the first corresponding message being a translation of the initial message;
determining, using the one or more computer processors, that the data store does not include the first corresponding message and, based thereon:
providing, using the one or more computer processors, the initial message to an initial transformation module in a sequence of transformation modules, each transformation module other than the initial transformation module being configured to accept, as input, an output of an immediately preceding transformation module in the sequence and provide, as output, a respective transformed message, and wherein a particular transformation module in the sequence is configured to flag at least a portion of the particular transformation module's output as not to be transformed by subsequent transformation modules in the sequence;
selecting, using the one or more computer processors, output of the final transformation module in the sequence as a transformed message in the first language; and
querying, using the one or more computer processors, the data store for a second corresponding message in the second language, the second corresponding message being a translation of the transformed message in the first language.

17. The system of claim 16, wherein the operations further comprise providing the initial message or the transformed message to a machine translation system to obtain a third corresponding message in the second language.

18. The system of claim 17, wherein the transformed message is translated to the third corresponding message in the second language if the data store does not include the second corresponding message.

19. The system of claim 17, wherein the initial message is translated to the third corresponding message in the second language if the transformation modules do not transform at least a portion of the initial message.

20. The system of claim 16, wherein one of the transformation modules is configured to perform operations comprising:
   identifying a chatspeak word or phrase in the initial message; and
   replacing the chatspeak word or phrase with a non-chatspeak word or phrase.

21. The system of claim 16, wherein one of the transformation modules is configured to perform a spelling check on the initial message.

22. The system of claim 16, wherein one of the transformation modules is configured to perform operations comprising:
   identifying an abbreviation in the initial message; and
   replacing the abbreviation with a word or a phrase corresponding to the abbreviation.

23. The system of claim 16, wherein one of the transformation modules is configured to perform operations comprising:
   identifying an acronym in the initial message; and
   replacing the acronym with a word or a phrase corresponding to the acronym.

24. The system of claim 16, wherein one of the transformation modules is configured to perform operations comprising:
   identifying a colloquial word or phrase in the initial message; and
   replacing the colloquial word or phrase with a word or a phrase representing the colloquial word or phrase.

25. The system of claim 16, wherein one of the transformation modules is configured to perform operations comprising:
   identifying a profane word or phrase in the initial message; and
   replacing the profane word or phrase with a non-profane word or phrase or removing the profane word or phrase.

26. The system of claim 16, wherein the initial message comprises text.

27. The system of claim 16, wherein the initial message comprises an emoticon.

28. The system of claim 16, wherein the initial message is part of a larger message.

29. A manufacture comprising:
   non-transitory computer readable media comprising executable instructions, the executable instructions being executable by one or more processors to perform operations comprising:
      obtaining, using the one or more processors, an initial message in a first language authored by a first person;
      querying, using the one or more processors, a data store for a first corresponding message in a second language, the first corresponding message being a translation of the initial message;
      determining, using the one or more processors, that the data store does not include the first corresponding message and, based thereon:
         providing, using the one or more processors, the initial message to an initial transformation module in a sequence of transformation modules, each transformation module other than the initial transformation module being configured to accept, as input, an output of an immediately preceding transformation module in the sequence and provide, as output, a respective transformed message, and wherein a particular transformation module in the sequence is configured to flag at least a portion of the particular transformation module's output as not to be transformed by subsequent transformation modules in the sequence;
         selecting, using the one or more processors, output of the final transformation module in the sequence as a transformed message in the first language; and
         querying, using the one or more processors, the data store for a second corresponding message in the second language, the second corresponding message being a translation of the transformed message in the first language.

* * * * *